US012748895B2

(12) United States Patent
Chen

(10) Patent No.: US 12,748,895 B2
(45) Date of Patent: Sep. 29, 2026

(54) BLOCKCHAIN-BASED DATA PROCESSING METHOD, DEVICE, AND READABLE STORAGE MEDIUM

(71) Applicant: Tencent Technology (Shenzhen) Company Limited, Shenzhen (CN)

(72) Inventor: Zimin Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 33 days.

(21) Appl. No.: 19/049,956

(22) Filed: Feb. 10, 2025

(65) Prior Publication Data

US 2025/0190629 A1 Jun. 12, 2025

Related U.S. Application Data

(63) Continuation of application No. PCT/CN2023/132668, filed on Nov. 20, 2023.

(30) Foreign Application Priority Data

Jan. 4, 2023 (CN) ........................ 202310006792.2

(51) Int. Cl.
*G06F 21/64* (2013.01)
*H04L 9/00* (2022.01)

(52) U.S. Cl.
CPC ................ *G06F 21/64* (2013.01); *H04L 9/50* (2022.05)

(58) Field of Classification Search
CPC ....... G06F 21/64; G06Q 30/0609; H04L 9/50; H04L 9/3236; H04L 67/10; H04L 67/104; H04L 63/083; H04L 63/12
See application file for complete search history.

(56) References Cited

U.S. PATENT DOCUMENTS 12,113,857 B2 * 10/2024 Guo ........................ G06F 21/62
12,462,255 B2 * 11/2025 Chen .................. G06Q 20/4014
(Continued)

FOREIGN PATENT DOCUMENTS

CN 112200570 A * 1/2021 ............. G06F 21/33
CN 113052699 A * 6/2021 ............. G06Q 40/04
(Continued)

OTHER PUBLICATIONS

International Search Report and Written Opinion from international Application No. PCT/CN2023/132668, Feb. 19, 2024.

*Primary Examiner* — Han Yang
(74) *Attorney, Agent, or Firm* — Crowell & Moring LLP

(57) ABSTRACT

A blockchain-based data processing method including: acquiring a resource consumption task including an initiating object address and a target resource identifier; calling, according to the resource consumption task, a resource consumption function, and determining, based on the resource consumption function, a holding object address holding a target virtual resource in the blockchain, the target virtual resource referring to a virtual resource represented by the target resource identifier; consuming, according to the initiating object address and the holding object address, the target virtual resource to obtain a transaction execution result of the resource consumption task; and broadcasting a resource consumption event corresponding to the transaction execution result to a service device corresponding to the initiating object address, so as to make the service device perform, on a target item, service processing associated with the resource consumption event, the target virtual resource being configured for representing ownership of the target item.

20 Claims, 11 Drawing Sheets

(56) References Cited

U.S. PATENT DOCUMENTS

| | | | | |
|---|---|---|---|---|
| 2022/0084042 | A1* | 3/2022 | Tang | G06F 21/64 |
| 2024/0289179 | A1* | 8/2024 | Chen | H04L 9/3239 |

FOREIGN PATENT DOCUMENTS

| | | | | | |
|---|---|---|---|---|---|
| CN | 114186267 | A | * | 3/2022 | G06Q 40/04 |
| CN | 116980412 | A | | 10/2023 | |

* cited by examiner

BLOCKCHAIN-BASED DATA PROCESSING METHOD, DEVICE, AND READABLE STORAGE MEDIUM

RELATED APPLICATION

This application is a continuation of and claims the benefit of priority to PCT Application No. PCT/CN2023/132668, filed Nov. 20, 2023, and entitled BLOCKCHAIN-BASED DATA PROCESSING METHOD, DEVICE, AND READABLE STORAGE MEDIUM, which claims priority to Chinese Patent Application No. 202310006792.2, entitled "BLOCKCHAIN-BASED DATA PROCESSING METHOD, DEVICE, AND READABLE STORAGE MEDIUM", filed with the China National Intellectual Property Administration on Jan. 4, 2023. The above applications are incorporated herein by reference in their entireties.

FIELD OF THE TECHNOLOGY

This application relates to the technical field of Internet, and in particular, to a blockchain-based data processing method, a device, and a computer-readable storage medium.

BACKGROUND OF THE DISCLOSURE

Characterized by decentralization and immutability, a blockchain technology can provide proof of ownership of various off-chain items (including digital items and physical items) with unique virtual resources as warrant types, and store and dispense the same in a distributed mode.

In real life, the off-chain items can be consumed. For example, game consumption resources in electronic game scenes can be integrated into equipment. If a virtual resource corresponding to the equipment (referred to as a virtual resource 1) and a virtual resource corresponding to the game consumption resources (referred to as a virtual resource 2) have been issued in a blockchain network, in order to correspond to the integration of the off-chain equipment and the game consumption resources (e.g., consumption of off-chain game consumption resources), in the related art, a virtual resource 3 will be issued in the blockchain network. The virtual resource 3 is configured for representing the warrant for the equipment in which a service attribute (derived from the consumed game consumption resource) is added, and the previously issued virtual resource 1 and virtual resource 2 are destroyed. Significantly, in the related art, for the consumed off-chain items, the blockchain will not deposit the virtual resource configured for representing the ownership of the consumed off-chain items. As a result, it may not be possible to trace the ownership of the consumed off-chain items.

SUMMARY

Embodiments of this application provide a blockchain-based data processing method, a device, and a readable storage medium, such that ownership of consumed target items can be accurately traced.

In an aspect, an embodiment of this application provides a blockchain-based data processing method, including:

acquiring a resource consumption task, the resource consumption task including an initiating object address and a target resource identifier;

calling, according to the resource consumption task, a resource consumption function in a smart contract, and determining, based on the resource consumption function, a holding object address in the blockchain, the holding object address referring to an object address holding a target virtual resource, and the target virtual resource referring to a virtual resource represented by the target resource identifier;

consuming, according to the initiating object address and the holding object address, the target virtual resource to obtain a transaction execution result of the resource consumption task; and broadcasting a resource consumption event corresponding to the transaction execution result to a service device corresponding to the initiating object address, so as to make the service device perform, on a target item, service processing associated with the resource consumption event, the target virtual resource being configured for representing ownership of the target item.

In an aspect, an embodiment of this application provides a blockchain-based data processing apparatus, including:

a first acquiring module, configured to acquire a resource consumption task, the resource consumption task including an initiating object address and a target resource identifier;

a function calling module, configured to call, according to the resource consumption task, a resource consumption function in a smart contract, and determine, based on the resource consumption function, a holding object address in the blockchain, the holding object address referring to an object address holding a target virtual resource, and the target virtual resource referring to a virtual resource represented by the target resource identifier;

a resource consumption module, configured to consume, according to the initiating object address and the holding object address, the target virtual resource to obtain a transaction execution result of the resource consumption task; and a first broadcast module, configured to broadcast a resource consumption event corresponding to the transaction execution result to a service device corresponding to the initiating object address, so as to make the service device perform, on a target item, service processing associated with the resource consumption event, the target virtual resource being configured for representing ownership of the target item.

The resource consumption module includes:

a first determining unit, configured to determine an address relationship between the initiating object address and the holding object address; and a second determining unit, configured to determine a resource consumption failure result as the transaction execution result of the resource consumption task if the address relationship is that the initiating object address is different from the holding object address, the resource consumption event including a first resource consumption event;

the first broadcast module includes:

a first generation unit, configured to generate the first resource consumption event corresponding to the transaction execution result, the first resource consumption event being configured for indicating that the initiating object address is different from the holding object address; and a first broadcast unit, configured to broadcast the first resource consumption event to the service device corresponding to the initiating object address, so as to make the service device generate, according to the first resource consumption event, first item consumption failure information, the first item consumption failure information being configured for indicating that the initiating object address does not hold the target item.

The resource consumption module includes:

a third determining unit, configured to determine the address relationship between the initiating object address and the holding object address;

a first acquiring unit, configured to acquire a current resource state of the target virtual resource if the address relationship is that the initiating object address is the same as the holding object address; and a resource consumption unit, configured to consume, according to the current resource state of the target virtual resource, the target virtual resource to obtain the transaction execution result of the resource consumption task.

The resource consumption unit includes:

a first determining subunit, configured to determine the resource consumption failure result as the transaction execution result of the resource consumption task if the current resource state of the target virtual resource is a resource consumed state, the resource consumption event including a second resource consumption event;

the first broadcast module includes:

a second generation unit, configured to generate the second resource consumption event corresponding to the transaction execution result, the second resource consumption event being configured for indicating that the current resource state of the target virtual resource is the resource consumed state; and a second broadcast unit, configured to broadcast the second resource consumption event to the service device corresponding to the initiating object address, so as to make the service device generate, according to the second resource consumption event, second item consumption failure information, the second item consumption failure information being configured for indicating that a current item state of the target item belonging to the initiating object address is an item consumed state.

The resource consumption unit includes:

a second determining subunit, configured to update the current resource state of the target virtual resource to the resource consumed state if the current resource state of the target virtual resource is a resource to-be-consumed state; and the second determining subunit being further configured to determine a resource consumption success result as the transaction execution result of the resource consumption task if the current resource state of the target virtual resource is successfully updated, the resource consumption event including a third resource consumption event;

the first broadcast module includes:

a third generation unit, configured to generate the third resource consumption event corresponding to the transaction execution result, the third resource consumption event being configured for indicating that the current resource state of the target virtual resource is updated from the resource to-be-consumed state to the resource consumed state; and a third broadcast unit, configured to broadcast the third resource consumption event to the service device corresponding to the initiating object address, so as to make the service device generate, according to the third resource consumption event, item consumption success information, the item consumption success information being configured for indicating that the target item belonging to the initiating object address is consumed successfully.

The function calling module includes:

a second acquiring unit, configured to acquire a first index key-value pair in the blockchain, the first index key-value pair including a first index key generated using a virtual resource and a first index value generated using a resource identifier;

a fourth determining unit, configured to acquire, according to the first index key-value pair and the target resource identifier, the target virtual resource; and a fifth determining unit, configured to acquire a holding object address of the target virtual resource.

The fourth determining unit includes:

a first broadcast subunit, configured to broadcast a resource abnormality event to the service device corresponding to the initiating object address if a first target index value including the target resource identifier does not exist in the first index key-value pair, so as to make the service device generate, according to the resource abnormality event, item abnormality information, the item abnormality information being configured for indicating that the target item belongs to an abnormal item; and a third determining subunit, configured to determine a virtual resource in a first target index key corresponding to the first target index value as the target virtual resource if the first target index value including the target resource identifier exists in the first index key-value pair.

The fifth determining unit includes:

a first acquiring subunit, configured to acquire a second index key-value pair in the blockchain, the second index key-value pair including a second index key generated using an object address and a second index value generated using a virtual resource; and a second acquiring subunit, configured to determine, in the second index key-value pair, a second index value including the target virtual resource as a second target index value, and determine an object address in a second index key corresponding to the second target index value as the holding object address.

The blockchain-based data processing apparatus further includes:

a result returning module, configured to return, if the transaction execution result is a resource consumption success result, the resource consumption success result to a resource device corresponding to the blockchain, so as to make the resource device update, according to the resource consumption success result, the current resource state of the target virtual resource to the resource consumed state, and acquire item consumption information of the target item, the item consumption information being stored in association with a resource consumption state of the target virtual resource.

The resource consumption task includes a transaction signature.

The blockchain-based data processing apparatus further includes:

a second acquiring module, configured to acquire an address public key corresponding to the initiating object address, use the address public key to perform signature verification on the transaction signature, and obtain a first digital digest;

a second broadcast module, configured to generate a second digital digest corresponding to the resource consumption task, generate, if the first digital digest is different from the second digital digest, a transaction abnormality event configured for indicating that the resource consumption task is an abnormal transaction, and broadcast the transaction abnormality event to the service device, so as to make the service device perform, according to the transaction abnormality event, validity verification on the resource consumption task; and a notification module, configured to notify, if the first digital digest is the same as the second digital digest, the function calling module to perform calling, according to the resource consumption task, the resource consumption function in the smart contract.

In an aspect, this application provides a computer device, including: a processor, a memory, and a network interface, the processor being connected to the memory and the network interface, the network interface being configured to provide a data communication function, the memory being configured to store computer programs, and the processor being configured to call the computer program to make the computer device execute the method in the embodiment of this application.

In an aspect, an embodiment of this application provides a computer-readable storage medium, having computer programs stored therein, the computer program being applicable to be loaded by a processor and execute the method in the embodiment of this application.

In an aspect, an embodiment of this application provides a computer program product, including a computer program, the computer program being stored in a computer-readable storage medium; a processor of a computer device reading the computer program from the computer-readable storage medium, and the processor executing the computer program to cause the computer device to execute the method in the embodiment of this application.

In the embodiments of this application, the resource consumption function is newly added in the smart contract, so that when the resource consumption task including the initiating object address and the target resource identifier is acquired, the resource consumption function can be called according to the resource consumption task, and the holding object address holding the target virtual resource can be determined in the blockchain based on the resource consumption function, where the target virtual resource refers to the virtual resource represented by the target resource identifier. Further, according to the initiating object address and the holding object address, the target virtual resource can be consumed to obtain the transaction execution result of the resource consumption task. Further, the resource consumption event corresponding to the transaction execution result is broadcast to the service device corresponding to the initiating object address, so as to make the service device perform, on the target item, service processing associated with the resource consumption event, where the target virtual resource is configured for representing the ownership of the target item. As can be seen above, the embodiment of this application provides a blockchain-based resource consumption method. According to the resource consumption method, when the target item is consumed, the target virtual resource configured for representing the ownership of the target item in the blockchain can be consumed in real time, and in this case, there is no need to perform destruction on the target virtual resource. Therefore, after the target item is successfully consumed, the blockchain still deposits the target virtual resource, and the ownership of the target item can be accurately traced through the consumed target virtual resource.

BRIEF DESCRIPTION OF THE DRAWINGS

To describe technical solutions in embodiments of this application or the related art more clearly, the following briefly introduces the accompanying drawings required for describing the embodiments or the related art. Apparently, the accompanying drawings in the following description show merely some embodiments of this application, and a person of ordinary skill in the art may derive other drawings from these accompanying drawings without creative efforts.

DESCRIPTION OF EMBODIMENTS

Figure 1:
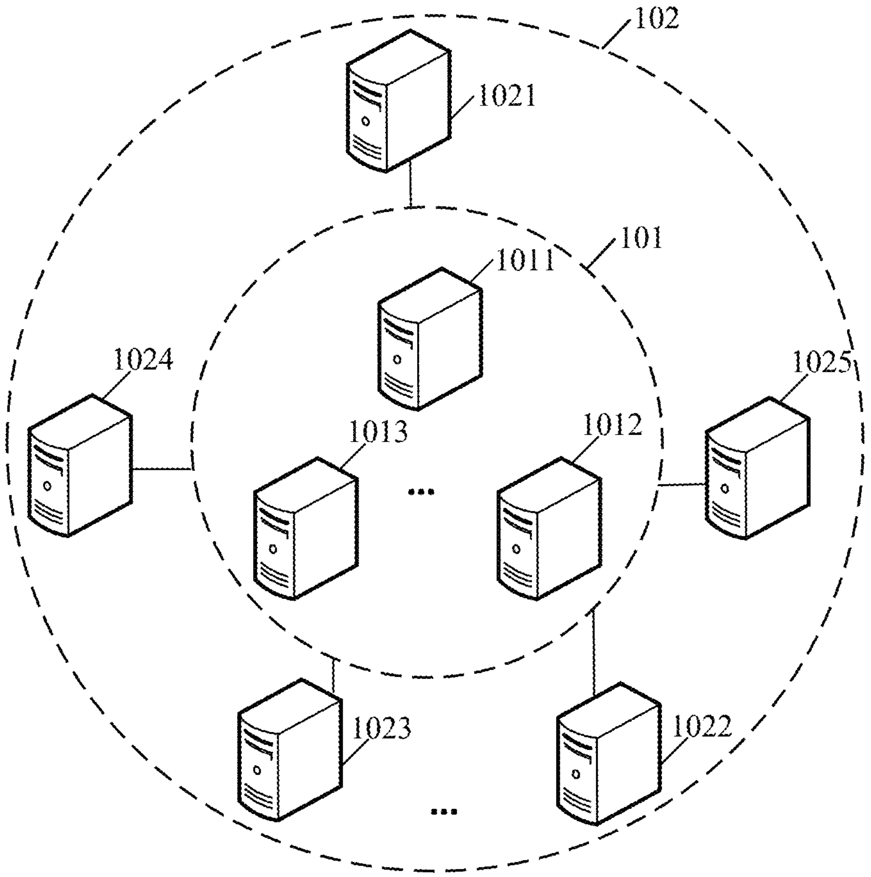
FIG. 1 is an example schematic diagram of a system architecture provided by an embodiment of this application.

The technical solutions in embodiments of this application are described in the following with reference to the accompanying drawings in the embodiments of this application. The described embodiments are merely some rather than all of the embodiments of this application. All other embodiments obtained by a person of ordinary skill in the art based on the embodiments of this application without making creative efforts shall fall within the protection scope of this application.

For ease of understanding, some of the terms are first briefly explained below:

1. Blockchain: In a narrow sense, the blockchain is a chained data structure with blocks as basic units, and digital digests are used in the block to verify the previously acquired transaction history, which is suitable for the needs of immutability and expandability in distributed accounting scenes; and in a broad sense, the blockchain also refers to distributed ledger technologies implemented by a blockchain structure, including distributed consensus, privacy and security protection, peer-to-peer communication technologies, network protocols, smart contracts, and the like. The goal of the blockchain is to implement a distributed ledger for recording data, which only allows additions, and does not allow deletions. The underlying structure of the ledger is a linear linked list. The linked list is composed of the "blocks" connected in series, a subsequent block records the Hash value of a previous block, and whether each block (and transactions in the block) is valid or not can be quickly verified in a mode of calculating the Hash value. If a node in a network proposes to add a new block, it needs to be confirmed by a consensus mechanism to reach consensus on the block.

2. Blockchain node: A blockchain network distinguishes blockchain nodes as consensus nodes (which may also be referred to as a core node) and synchronization nodes (which may include a data node and a light node). The consensus node is responsible for the consensus service of the entire blockchain network. The synchronization node is responsible for synchronizing the ledger information of the consensus node, e.g., synchronizing the latest block data. The internal structure of both the consensus node and the synchronization node includes network communication components, because the blockchain network is essentially a peer to peer (P2P) network, which needs to communicate with other nodes in the blockchain network through P2P components. Resources and services in the blockchain network are dispersed on various nodes, and the transmission of information and the implementation of the services are carried out directly between nodes, without the intervention of intermediate links or centralized servers (third parties).
3. Smart contract: It is a computer protocol aimed at disseminating, verifying, or executing contracts in an information-based mode. In a blockchain system, the smart contract (referred to as contract) is a code that may be understood and executed by each node of the blockchain, which can execute any logic and obtain results. In practice, the smart contract manages and trials through transactions on the blockchain. Each transaction is equivalent to a remote procedure call (RPC) request to the blockchain system. If the smart contract is equivalent to an executable program, the blockchain is equivalent to an operating system that provides a running environment. The blockchain may contain multiple contracts (such as the contract to which a resource consumption function in this application belongs), distinguished by a contract identity (ID), an identification number or a name.
4. Contract execution: By initiating a transaction (such as a resource consumption task of this application), a user can call the contract that has been deployed on the blockchain (such as a resource consumption function of this application, and the like). Each node in a blockchain system runs the same contract. For a contract that needs to read data, the ledger of the node itself will be accessed. Eventually each node will verify whether execution results are consistent with each other (consensus). If the execution results are consistent, each node will deposit necessary results in their respective ledgers and return the results to the user.
5. Virtual resource: It is a digital product, which refers to an on-chain product in the blockchain network of an off-chain item, and a virtual resource of this application (e.g., a target virtual resource) may represent the ownership of the off-chain item, so the virtual resource in the embodiments of this application may be understood as a warrant. For example, if the off-chain item is a piece of land, the virtual resource represents the ownership of the land; if the off-chain item is game skin, the virtual resource represents the ownership of the game skin; and if the off-chain item is a concert ticket, the virtual resource represents the ownership of the concert ticket. The embodiments of this application do not limit the total quantity of corresponding virtual resources, it may be 1, such as a piece of land that has only one virtual resource (e.g., the ownership of the land); and it may be a positive integer greater than 1, for example a game developer produces 10 identical game skins and issues, on the blockchain, virtual resources corresponding to the 10 game skins, respectively.
6. Resource identifier: It is an identifier configured for representing the on-chain product in the blockchain network of the off-chain item, e.g., an identifier configured for representing the virtual resource. If the total quantity of corresponding virtual resources is greater than 1, for example, if the game developer produces 10 identical game skins, the total quantity of virtual resources corresponding to the 10 identical game skins is equal to 10. In this case, the 10 virtual resources have the same identifier in the blockchain network, but each virtual resource may correspond to an index identifier, respectively, so as to differentiate the 10 virtual resources, and therefore the resource identifier in the embodiment of this application may carry the index identifier. For example, if the index identifier is 1, it represents the first virtual resource in the above 10 virtual resources.

Referring to FIG. 1, FIG. 1 is a schematic diagram of a system architecture provided by an embodiment of this application. As shown in FIG. 1, the system architecture may be a blockchain network, where the blockchain network may include a consensus network 101 and a synchronization network 102. Nodes in the synchronization network 102 may be referred to as synchronization nodes, and the synchronization nodes mainly perform service execution, do not participate in accounting consensus, and obtain block data from the consensus network 101 through identity authentication. The consensus network 101 may also be referred to as a core network, nodes in the consensus network 101 may be referred to as consensus nodes, and the consensus nodes have the full amount of data. The consensus network 101 and the synchronization network 102 may be in different network environments. In general, the consensus network 101 is in a private network, while the synchronization network 102 is in a shared network, and the two networks interact through routing boundaries.

The above consensus network 101 may include one or more consensus nodes, and the quantity of the consensus nodes will not be limited herein. Referring again to FIG. 1, the consensus network 101 may include a consensus node 1011, a consensus node 1012, . . . , a consensus node 1013.

The above synchronization network 102 may include one or more synchronization nodes, and the quantity of the synchronization nodes will not be limited herein. Referring again to FIG. 1, the synchronization network 102 may include a synchronization node 1021, a synchronization node 1022, a synchronization node 1023, . . . , a synchronization node 1024, and a synchronization node 1025.

Each blockchain node (including the consensus node in the consensus network 101 and the synchronization node in the synchronization network 102) may receive transaction data sent by a client when performing normal operation, generate, based on the received transaction data, a block, and then perform on-chain processing of the block. In an implementation of this application, relevant data such as user information (e.g., a resource consumption task) is involved. When the embodiment of this application is applied to a specific product or technology, a permission or consent of a user is required, and collection, use, and processing of the relevant data need to comply with relevant laws, regulations, and standards of relevant countries and regions.

In order to ensure data interoperability between the blockchain nodes, there may be a data connection between the blockchain nodes, for example, there is a data connection between the consensus node 1011 and the consensus node 1012, there is a data connection between the consensus node 1011 and the consensus node 1013, there is a data connection between the synchronization node 1021 and the synchronization node 1023, and so on. Further, there is a data connection between the consensus network 101 and the synchronization network 102, for example, there is a data connection between the consensus node 1011 and the synchronization node 1022, there is a data connection between the consensus node 1012 and the synchronization node 1023, and so on.

Data or block transmission between the blockchain nodes may be performed via the above data connections. The above data connections between the blockchain nodes may be based on node identifiers. Each blockchain node in the blockchain network has a node identifier corresponding thereto, and each of the above blockchain nodes can store node identifiers of other blockchain nodes having a connection relationship with the blockchain node itself, so that the data acquired or the block generated can be subsequently broadcast, according to the node identifiers of other blockchain nodes, to other blockchain nodes. For example, the consensus node 1011 may maintain a list of node identifiers, and node names and node identifiers of other blockchain nodes are saved in the list of node identifiers, as shown in Table 1.

TABLE 1

| Node name | Node identifier |
|---|---|
| Consensus node 1012 | AAAAA |
| Consensus node 1013 | BBBBB |
| . . . | . . . |
| Synchronization node 1021 | CCCCC |
| Synchronization node 1022 | DDDDD |
| Synchronization node 1023 | EEEEE |
| . . . | . . . |

The node identifier may be an Internet Protocol (IP) address between networks and any other type of information that can be configured for identifying the blockchain node in the blockchain network.

Assuming that the consensus node 1011 has a node identifier of FFFFFF, the consensus node 1011 may send a data synchronization request to the synchronization node 1021 through a node identifier CCCCC, and the synchronization node 1021 may know, through the node identifier FFFFFF, that the data synchronization request is sent by the consensus node 1011. Similarly, the synchronization node 1023 may send a resource consumption task to the consensus node 1011 through the node identifier FFFFFF, and the consensus node 1011 may know, through a node identifier EEEEE, that the resource consumption task is sent by the synchronization node 1023, and the same is true for data transmission between other nodes, so it will not be repeated one by one.

The above data connection is not limited by a connection mode and may be a direct or indirect connection performed in a wired communication mode, or a direct or indirect connection performed in a wireless communication mode, or may be achieved in other connection modes, which is not limited by this application.

The blockchain nodes in the blockchain network in FIG. 1 include, but are not limited to, terminal devices or servers. The above server may be a stand-alone physical server, or may be a server cluster or a distributed system including multiple physical servers, or may be a cloud server that provides a cloud service, a cloud database, cloud computing, a cloud function, cloud storage, a network service, cloud communication, a middleware service, a domain name service, a security service, a content delivery network (CDN), a big data and artificial intelligence platform, and other basic cloud computing services. The above terminal device includes, but is not limited to, a mobile phone, a computer, an intelligent voice interaction device, a smart home appliance, an on board terminal, an aircraft, and the like. The terminal device may be connected directly or indirectly to the server in a wired or wireless mode, which is not limited by the embodiment of this application.

Figure 2:
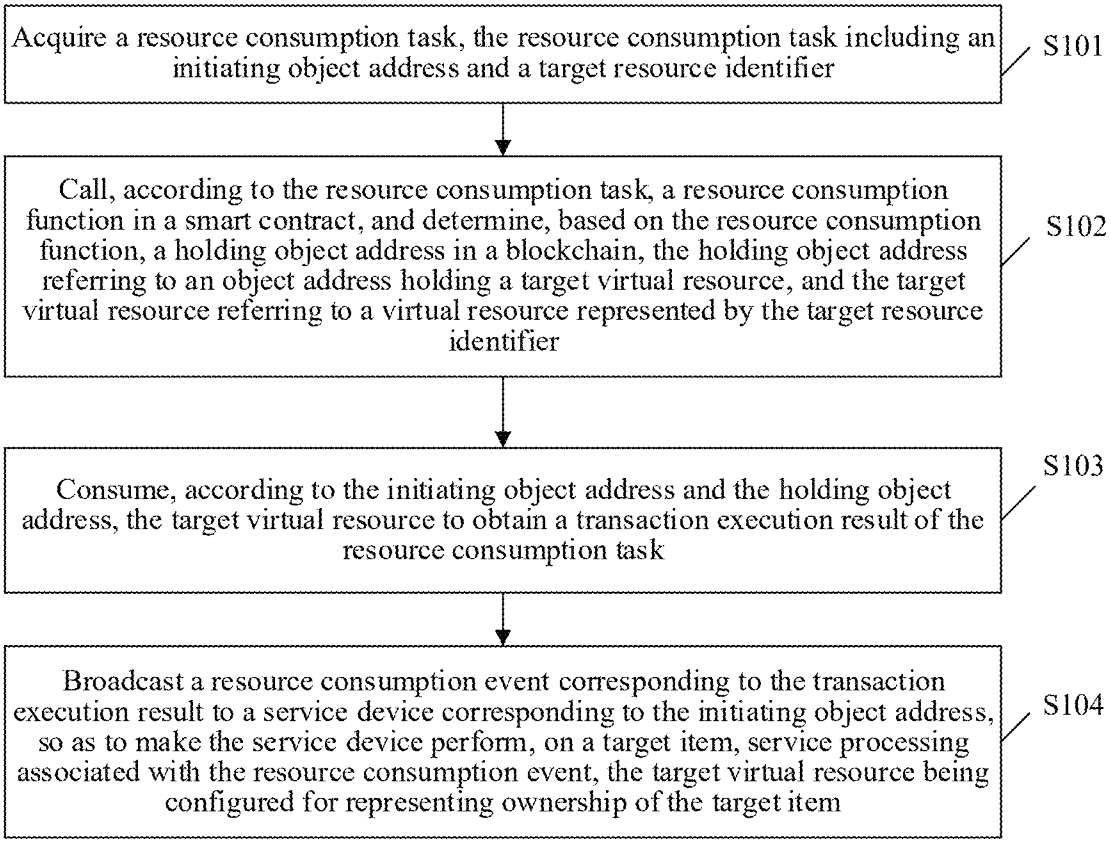
FIG. 2 is an example schematic flowchart I of a blockchain-based data processing method provided by an embodiment of this application.

Further, referring to FIG. 2, FIG. 2 is a schematic flowchart I of a blockchain-based data processing method provided by an embodiment of this application. The blockchain-based data processing method is executable by blockchain nodes (including the synchronization node and the consensus node in FIG. 1). As shown in FIG. 2, the blockchain-based data processing method may include at least the following operation S101 to operation S104.

Operation S101: Acquire a resource consumption task, the resource consumption task including an initiating object address and a target resource identifier.

Specifically, the resource consumption task includes a transaction signature. The blockchain node acquires an address public key corresponding to the initiating object address, uses the address public key to perform signature verification on the transaction signature, and obtains a first digital digest. The blockchain node generates a second digital digest corresponding to the resource consumption task, generates, if the first digital digest is different from the second digital digest, a transaction abnormality event configured for indicating that the resource consumption task is an abnormal transaction, and broadcasts the transaction abnormality event to the service device, so as to make the service device perform, according to the transaction abnormality event, validity verification on the resource consumption task. If first digital digest is same as the second digital digest, operation S102 is executed.

Figure 3:
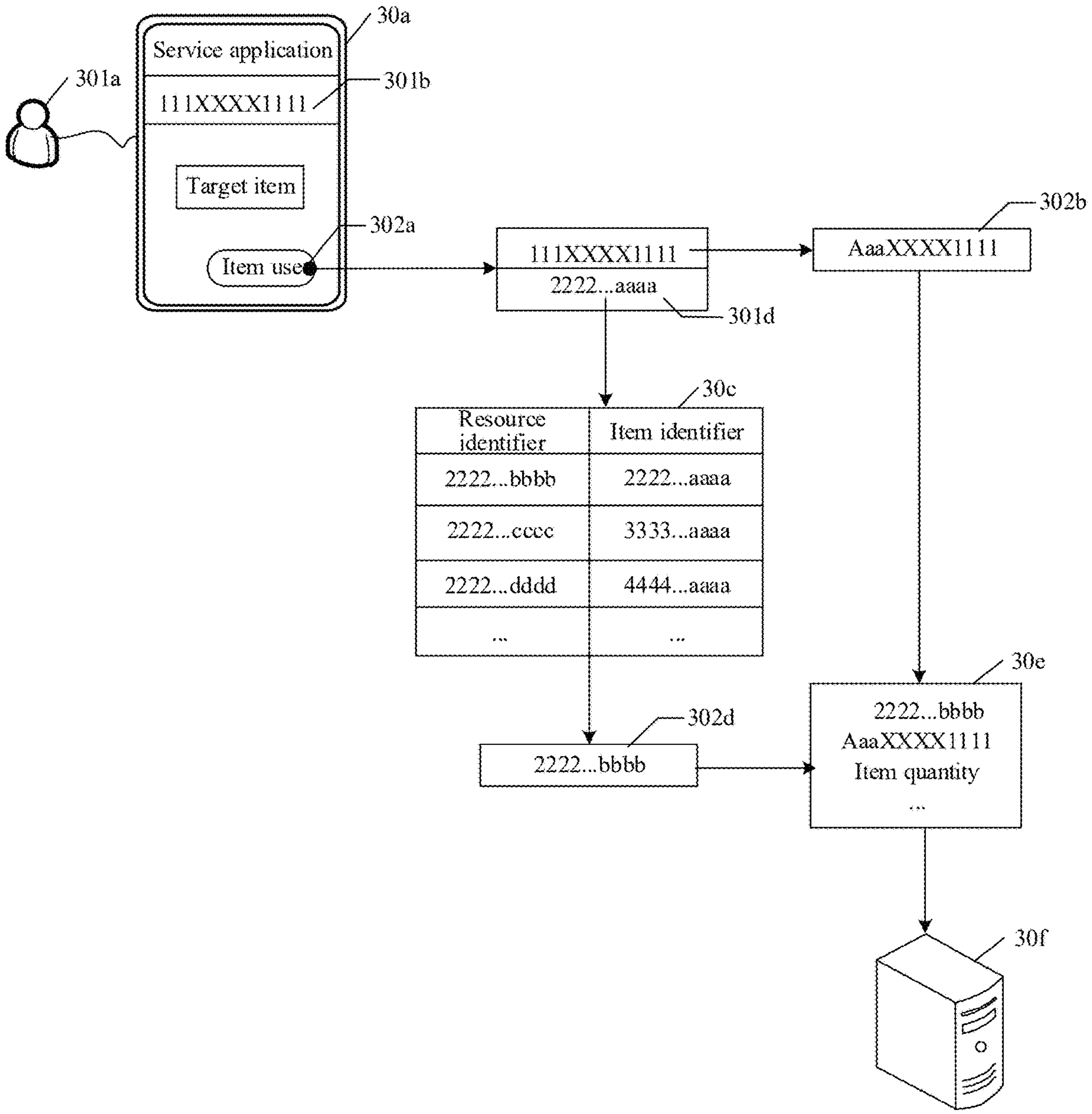
FIG. 3 is an example schematic flowchart I of a scene of blockchain-based data processing provided by an embodiment of this application.

The embodiment of this application does not limit specific service scenes of the resource consumption task, which may be set according to actual application scenarios, including, but not limited to, a consumption scene configured for representing the ownership of a movie ticket, a consumption scene configured for representing the ownership of a concert ticket, and the like. Referring to FIG. 3 together, FIG. 3 is a schematic flowchart I of a scene of blockchain-based data processing provided by an embodiment of this application. As shown in FIG. 3, a service object 301*a* has a binding relationship with a service device 30*a*, where the service device 30*a* includes, but is not limited to, a terminal device or a server. The above server may be a stand-alone physical server, or may be a server cluster or a distributed system including multiple physical servers, or may be a cloud server that provides a cloud service, a cloud database, cloud computing, a cloud function, cloud storage, a network service, cloud communication, a middleware service, a domain name service, a security service, a content delivery network (CDN), a big data and artificial intelligence platform, and other basic cloud computing services. The above terminal device includes, but is not limited to, a mobile phone, a computer, an intelligent voice interaction device, a smart home appliance, an on board terminal, an aircraft, and the like.

The service device 30*a* may be installed with an application client (such as a service application in FIG. 3), the application client may be a financial planning application, a video application, a convenient life application, a social application, an instant messaging application, a game application, a music application, a shopping application, a novel application, a ticketing application, a browser, and other application clients that have the function of loading a target virtual resource configured for representing the ownership of a target item. The application client may be a stand-alone client or an embedded sub-client integrated in a particular client (e.g., a social client, an instant messaging client, a multimedia client, and the like), without limitation herein.

As shown in FIG. 3, the service object 301*a* may log in a service identity 301*b* in a service application of the service device 30*a*. The service identity 301*b* is illustrated as "111XXXX1111" in FIG. 3. Therefore, the service device 30*a* may display, in the service application, a target item belonging to the service identity 301*b*, and the target item is an off-chain item that may be consumed. For example, if the service application is a game application, the target item may be an electronic game consumption resource; and for example, if the service application is a ticketing application, the target item may be a concert ticket or a movie ticket. The embodiment of this application does not limit the item type of the target item, which may be any type of item that may be consumed.

If the service object 301*a* selects to consume the target item, as shown in FIG. 3, the service object 301*a* triggers an item use control 302*a* in FIG. 3 after selecting the target item, the service device 30*a* acquires, in response to a trigger operation for the item use control 302*a*, the service identity 301*b* and an item identifier 301*d* of the target item. The item identifier 301*d* may be any type of information that can be configured for identifying the target item, for example, and the item identifier 301*d* is a transaction quantity of the target item. The item identifier 301*d* is illustrated as "2222 . . . aaaa" in the embodiment of this application. Further, the service device 30*a* takes the service identity 301*b* as service object information of the service object 301*a*, and acquires, through the service object information, an object identity 302*b* (equivalent to an object address) registered by the service object 301*a* in the blockchain for the service application, which is referred to as an initiating object address in the embodiment of this application. The service object 301*a* may register, in the blockchain, the object identity (referred to as the initiating object address in this application) for the service application through the service object information. When the registration is successful, the blockchain may create an index relationship between the service object information and the initiating object address and may return the index relationship between the service object information and the initiating object address to the service device 30*a*. The object identity 302*b* (e.g., the initiating object address) is illustrated as "AaaXXXX1111" in FIG. 3.

Further, the service device 30*a* acquires an index table 30*c*. As shown in FIG. 3, the index table 30*c* includes an index key generated using a resource identifier and an index value generated using an item identifier. The embodiment of this application illustrates that there are an index relationship between a resource identifier "2222 . . . bbbb" and the item identifier "2222 . . . aaaa", an index relationship between a resource identifier "2222 . . . cccc" and an item identifier "3333 . . . aaaa", and an index relationship between a resource identifier "2222 . . . dddd" and an item identifier "4444 . . . aaaa". Items represented by item identifiers in the index table 30*c* belong to the service identity 301*b* of the service application, e.g., the items represented by the item identifiers in the index table 30*c* are items held by the service object 301*a* in the service application. The resource identifier may refer to a certificate identification code of a virtual resource, the virtual resource may be a digital collection, and a particular object holding the virtual resource can have a unique right of ownership of an item corresponding to the virtual resource.

Further, the service device 30*a* determines, through the item identifier 301*d* (e.g., 2222 . . . aaaa), the target resource identifier 302*d* (e.g., 2222 . . . bbbb) in the index table 30*c*. If the service application provides the ability to compose transactions, the service device 30*a* may generate, according to the target resource identifier 302*d*, the initiating object address 302*b*, and item quantity (typically 1), a resource consumption task 30*e*. The specific content of the resource consumption task 30*e* may be determined according to the actual application scenarios, which is not limited by the embodiment of this application. As shown in FIG. 3, after generating the resource consumption task 30*e*, the service device 30*a* may transmit the resource consumption task 30*e* to a blockchain node 30*f* in the blockchain network in a peer-to-peer communication connection mode.

The above describes a scene in which the service device 30*a* generates the resource consumption task 30*e* and transmits the resource consumption task 30*e* to the blockchain node 30*f* when the service application provides the ability to compose transactions. If the service application does not provide the ability to compose transactions, referring to the description of operation S201 in the embodiment corresponding to FIG. 7 below, which is not described in detail herein.

Figure 4:
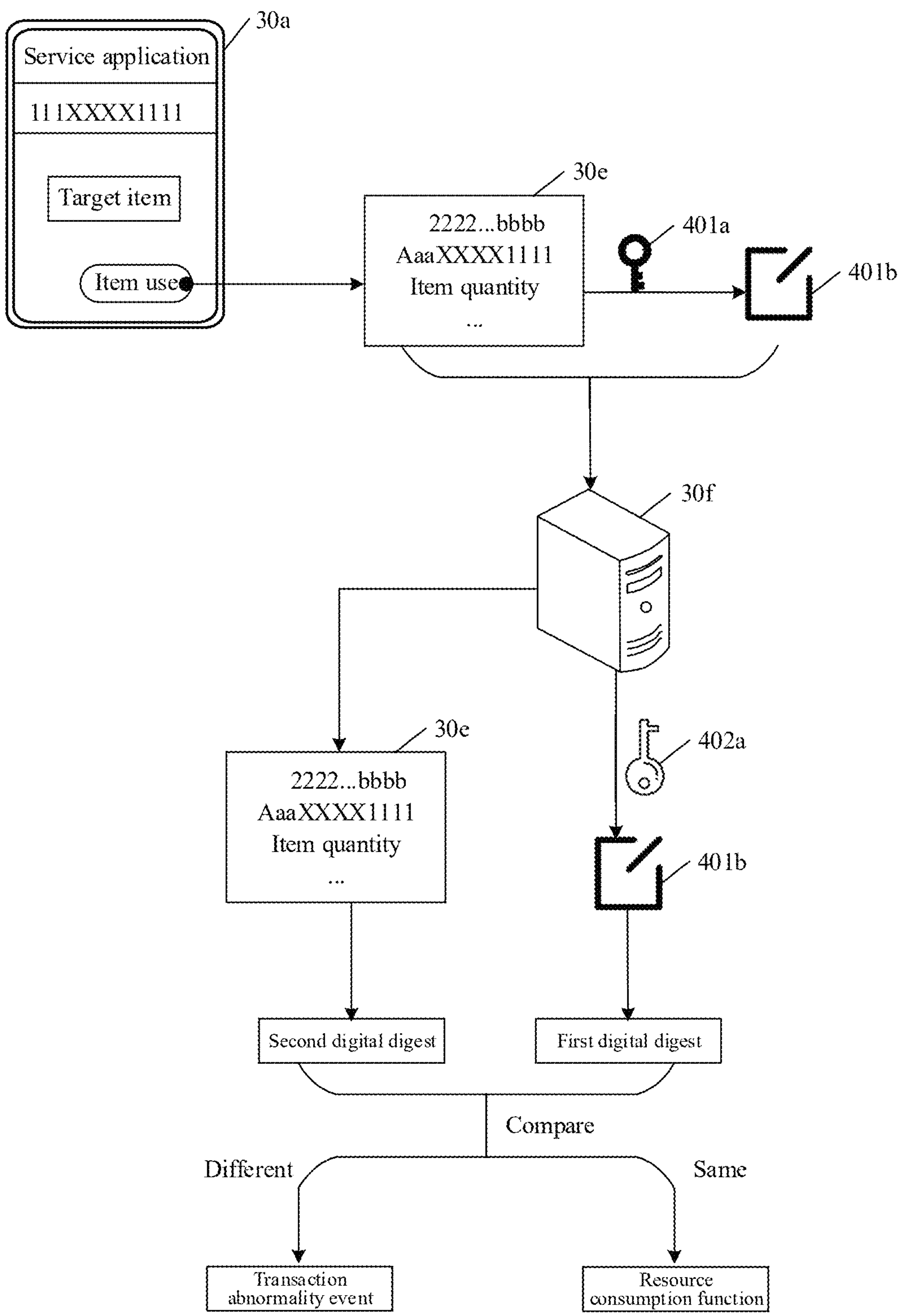
FIG. 4 is an example schematic flowchart II of a scene of blockchain-based data processing provided by an embodiment of this application.

In order to safeguard the security of transmission of the transaction, before transmitting the resource consumption task 30*e* to the blockchain node 30*f*, the service device 30*a* may perform, based on an address private key associated with the initiating object address 302*b* (illustrated as AaaXXXX1111 in FIG. 3), signature processing on the resource consumption task 30*e*. In conjunction with FIG. 3 and FIG. 4, FIG. 4 is a schematic flowchart II of a scene of blockchain-based data processing provided by an embodiment of this application. As shown in FIG. 4, the service device 30*a* performs, based on an address private key 401*a*, signature processing on the resource consumption task 30*e* to obtain a transaction signature 401*b*, and further, transmits the resource consumption task 30*e* carrying the transaction signature 401*b* to the blockchain node 30*f*.

After acquiring the resource consumption task 30*e* carrying the transaction signature 401*b*, the blockchain node 30*f* acquires an address public key 402*a* corresponding to the initiating object address 302*b* (illustrated as AaaXXXX1111 in FIG. 4). The address private key 401*a* and the address public key 402*a* are a pair of asymmetric keys, the initiating object address 302*b* is generated based on the address public key 402*a*, and the address private key 401*a* is not publicly available and is kept by the service object, or by a device authorized by the service object. Further, the blockchain node 30*f* performs signature verification on the transaction signature 401*b* through the address public key 402*a* to obtain a first digital digest, performs a Hash calculation on the resource consumption task 30*e* to obtain a second digital digest, and then compares the first digital digest and the second digital digest. If the first digital digest is different from the second digital digest, the blockchain node 30*f* may determine that the resource consumption task 30*e* is an abnormal transaction, then generates a transaction abnormality event configured for indicating that the resource consumption task 30*e* is an abnormal transaction, and broadcasts the transaction abnormality event to the service device 30*a*. In this case, the service device 30*a* will perform, based on the transaction abnormality event, validity verification on the resource consumption task. If the first digital digest is the same as the second digital digest, the blockchain node 30*f* executes operation S102.

Interfaces and controls shown in FIG. 3 and FIG. 4 are only some expressions for reference, and in the actual service scenes, a developer may perform relevant design according to product requirements, and the embodiment of this application does not limit specific forms of the interfaces and the controls involved.

Operation S102: Call, according to the resource consumption task, a resource consumption function in a smart contract, and determine, based on the resource consumption function, a holding object address in a blockchain, the holding object address referring to an object address holding a target virtual resource, and the target virtual resource referring to a virtual resource represented by the target resource identifier.

Specifically, the blockchain node may call, according to the resource consumption task, the resource consumption function in the smart contract. The resource consumption function may refer to a function (also referred to as a method) in the smart contract. The resource consumption function is a code that can be executed repeatedly. The resource consumption function is a function that may be called inside the same smart contract or a function that may be called inside another smart contract. The resource consumption function may provide a series of functions for consuming the virtual resource, for example, by executing the resource consumption function, the following functions may be implemented: determination of the holding object address, consumption of the virtual resource (after the consumption processing, a transaction execution result may be obtained), and broadcasting of a resource consumption event corresponding to the transaction execution result, and so on. Based on the resource consumption function, a first index key-value pair may be acquired in the blockchain. The first index key-value pair includes a first index key generated using a virtual resource and a first index value generated using a resource identifier. According to the first index key-value pair and the target resource identifier, a target virtual resource and a holding object address of the target virtual resource are determined.

The specific process of the blockchain node determining, according to the first index key-value pair and the target resource identifier, the target virtual resource may include the following operations: broadcast a resource abnormality event to a service device corresponding to the initiating object address if a first target index value including the target resource identifier does not exist in the first index key-value pair, so as to make the service device generate, according to the resource abnormality event, item abnormality information, the item abnormality information being configured for indicating that the target item belongs to an abnormal item; and determine, if a first index value including the target resource identifier exists in the first index key-value pair, the first index value including the target resource identifier as a first target index value and determine a virtual resource in a first index key corresponding to the first target index value as the target virtual resource. The target virtual resource may be a digital collection, and a particular object holding the target virtual resource can have a unique right of ownership of a target item corresponding to the virtual resource; and in other words, if a particular object holds the target virtual resource, then it indicates that the target item represented by the target virtual resource belongs to the object. Specifically, the target virtual resource may be a digital asset with a unique identifier (e.g., the target resource identifier) that is generated and issued based on the blockchain technology, has passed a content compliance review, and can only be owned by a service identity that has been authenticated with a real name.

The specific process of determining the holding object address of the target virtual resource may include the following operations: acquire, based on the resource consumption function, a second index key-value pair in the blockchain, the second index key-value pair including a second index key generated using an object address and a second index value generated using a virtual resource; and acquire, in the second index key-value pair, a second index value including the target virtual resource, determine the second index value including the target virtual resource as a second target index value, and determine an object address in a second index key corresponding to the second target index value as the holding object address.

This application designs, based on protocol standards for the virtual resource (herein specifically referring to the virtual resource configured for representing the ownership of the off-chain item) of the smart contract on the blockchain, a consumable virtual resource scheme, records, by adding interface standards for consumption of the virtual resource to the above standards, consumption records of the virtual resource in the contract, and sends relevant resource consumption events. For some ticket-type off-chain items or consumption class items in games and other scenes, after the service object uses interests corresponding to the off-chain items, corresponding on-chain resources (e.g., the virtual resource in the embodiment of this application, including the target virtual resource) thereof are consumed, so as to better adapt to resource consumption service scenes.

Figure 5:
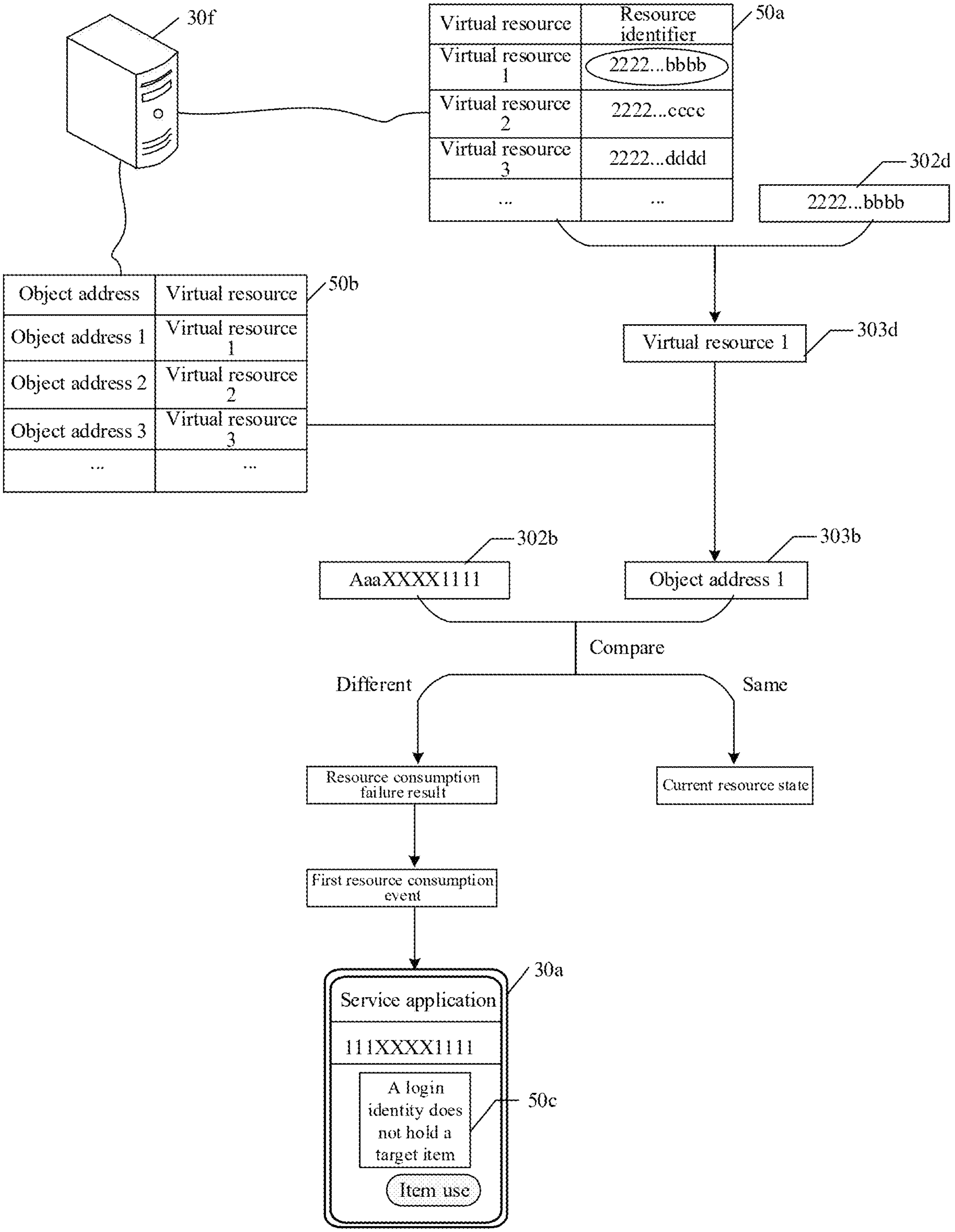
FIG. 5 is an example schematic flowchart III of a scene of blockchain-based data processing provided by an embodiment of this application.

Referring to FIG. 5 together, FIG. 5 is a schematic flowchart III of a scene of blockchain-based data processing provided by an embodiment of this application. As shown in FIG. 5, the blockchain node 30*f* may acquire a first index key-value pair 50*a* in the blockchain, and the first index key-value pair 50*a* includes a first index key generated using the virtual resource and a first index value generated using the resource identifier. For ease of understanding and description, FIG. 5 illustrates that the first index key-value pair 50*a* includes 3 index value-value pairs, where the first index key-value pair is a virtual resource 1 and a resource identifier "2222 . . . bbbb", the second index value-value pair is a virtual resource 2 and a resource identifier "2222 . . . cccc", and the third index key-value pair is a virtual resource 3 and a resource identifier "2222 . . . dddd".

Further, the blockchain node 30*f* uses the target resource identifier 302*d* (illustrated as 2222 . . . bbbb in FIG. 5) as a to-be-retrieved index value, and retrieves the to-be-retrieved index value in the first index key-value pair 50*a*. If the to-be-retrieved index value does not exist in the first index key-value pair 50*a*, e.g., a first target index value including the target resource identifier 302*d* does not exist, the blockchain node 30*f* may determine that the target resource identifier 302*d* does not exist in the blockchain, then may determine that the target resource identifier 302*d* is an abnormal resource identifier, and therefore may generate a resource abnormality event configured for indicating that the target resource identifier 302*d* is an abnormal resource identifier. Further, the blockchain node 30*f* broadcasts the resource abnormality event to the service device corresponding to the initiating object address, e.g., the service device 30*a* as illustrated in FIG. 3 and FIG. 4.

If the to-be-retrieved index value exists in the first index key-value pair 50*a*, as illustrated in FIG. 5, the first target index value including the target resource identifier 302*d* exists in the first index key-value pair, and the blockchain node 30*f* determines a virtual resource in a first target index key corresponding to the first target index value as a target virtual resource 303*d*. The target virtual resource 303*d* is illustrated as the virtual resource 1 in FIG. 5. Further, the blockchain node 30*f* needs to determine a holding object address holding the target virtual resource 303*d* on the chain, and therefore may acquire a second index key-value pair 50*b* in the blockchain, where the second index key-value pair 50*b* includes a second index key generated using an object address, and a second index value generated using the virtual resource. For ease of understanding and description, FIG. 5 illustrates that the second index key-value pair 50*b* includes 3 index key-value pairs, where the first index key-value pair is an object address 1 and the virtual resource 1, the second index key-value pair is an object address 2 and the virtual resource 2, and the third index key-value pair is an object address 3 and the virtual resource 3.

Further, the blockchain node 30*f* uses the target virtual resource 303*d* (illustrated as the virtual resource 1 in FIG. 5) as a to-be-retrieved index value, and retrieves the to-be-retrieved index value in the second index key-value pair 50*b*. As shown in FIG. 5, the first index key-value pair in the second index key-value pair 50*b* includes the target virtual resource 303*d*, e.g., a second target index value includes the target virtual resource 303*d*, and therefore an object address, in a second target index key, corresponding to the second target index value is determined to be a holding object address 303*b*. The holding object address 303*b* is illustrated as the object address 1 in FIG. 5.

Operation S103: Consume, according to the initiating object address and the holding object address, the target virtual resource to obtain a transaction execution result of the resource consumption task.

Specifically, an address relationship between the initiating object address and the holding object address is determined; a current resource state of the target virtual resource is acquired if the address relationship is the initiating object address is the same as the holding object address; and according to the current resource state of the target virtual resource, the target virtual resource is consumed to obtain the transaction execution result of the resource consumption task.

The specific process of consuming, according to the current resource state of the target virtual resource, the target virtual resource to obtain the transaction execution result of the resource consumption task may include the following operation: determine a resource consumption failure result as the transaction execution result of the resource consumption task if the current resource state of the target virtual resource is a resource consumed state.

The specific process of consuming, according to the current resource state of the target virtual resource, the target virtual resource to obtain the transaction execution result of the resource consumption task may include the following operations: update the current resource state of the target virtual resource to the resource consumed state if current resource state of the target virtual resource is a resource to-be-consumed state; and determine a resource consumption success result as the transaction execution result of the resource consumption task if the current resource state of the target virtual resource is successfully updated.

Referring again to FIG. 5, the blockchain node 30*f* determines the address relationship between the holding object address 303*b* and the initiating object address 302*b* (illustrated as AaaXXXX1111 in FIG. 5), and this operation does not expand on the scene in which the holding object address 303*b* and the initiating object address 302*b* are different, referring to the description in the following figures, e.g., in a corresponding embodiment.

Figure 6:
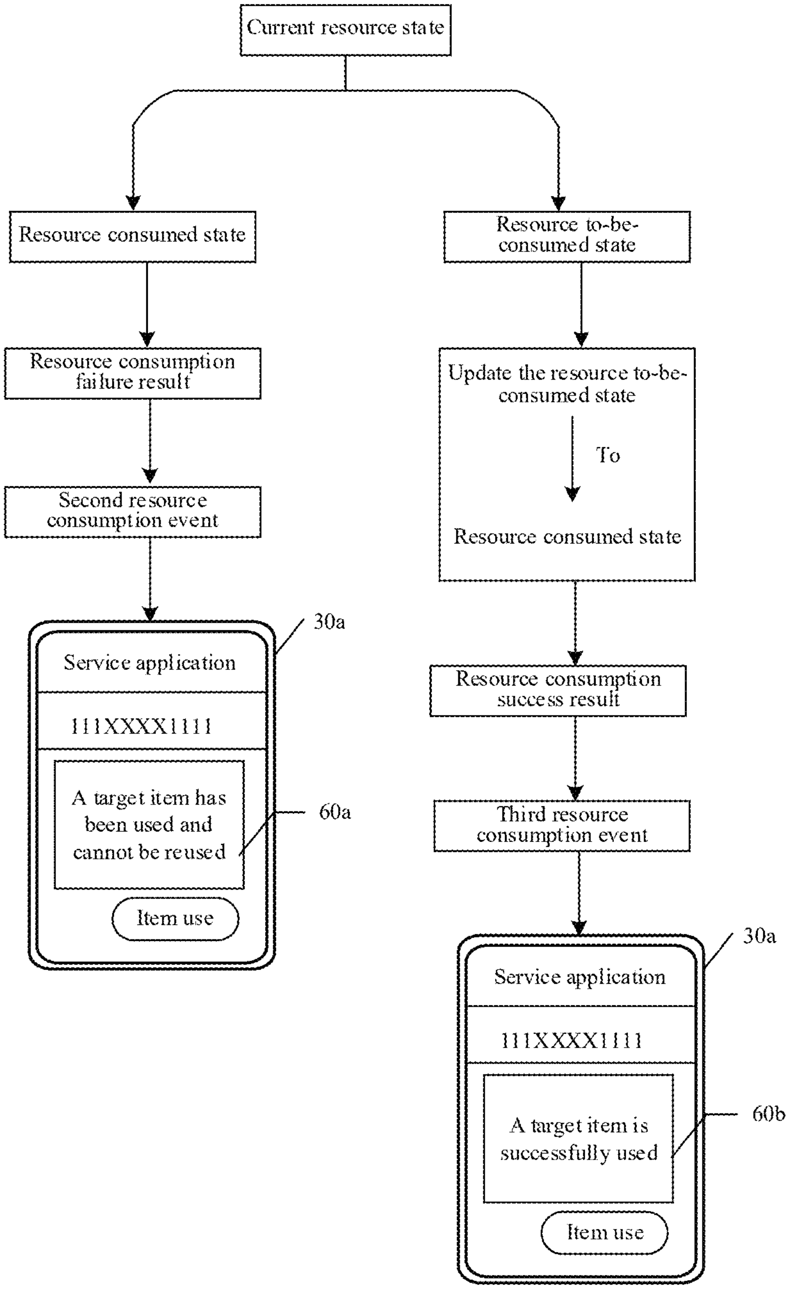
FIG. 6 is an example schematic flowchart IV of a scene of blockchain-based data processing provided by an embodiment of this application.

If the holding object address 303*b* and the initiating object address 302*b* are the same, the blockchain node 30*f* acquires the current resource state of the target virtual resource 303*d* (illustrated as the virtual resource 1 in FIG. 5). Referring to FIG. 6 together, FIG. 6 is a schematic flowchart IV of a scene of blockchain-based data processing provided by an embodiment of this application. If the current resource state of the target virtual resource 303*d* is the resource consumed state, the blockchain node 30*f* determines the resource consumption failure result as the transaction execution result of the resource consumption task, e.g., the target virtual resource 303*d* has been consumed, and therefore the blockchain node 30*f* executes, through the resource consumption function, the transaction execution result of the resource consumption task as a transaction failure execution result. Further, the blockchain node 30*f* generates a second resource consumption event configured for indicating that the current resource state of the target virtual resource 303*d* is the resource consumed state, and broadcasts the second resource consumption event to the service device 30*a*. After acquiring the second resource consumption event, the service device 30*a* may generate second item consumption failure information 60*a*. As illustrated in FIG. 6, the second item consumption failure information 60*a* is "a target item has been used and cannot be reused", indicating the service object corresponding to the service device 30*a* that a current item state of the target item is an item consumed state, e.g., the target item has been consumed and may not be consumed twice.

Operation S104: Broadcast the resource consumption event corresponding to the transaction execution result to the service device corresponding to the initiating object address, so as to make the service device perform, on the target item, service processing associated with the resource consumption event, the target virtual resource being configured for representing ownership of the target item.

Specifically, the resource consumption event includes the second resource consumption event; the second resource consumption event corresponding to the transaction execution result is generated, where the second resource consumption event is configured for indicating that the current resource state of the target virtual resource is the resource consumed state; and the second resource consumption event is broadcast to the service device corresponding to the initiating object address, so as to make the service device generate, according to the second resource consumption event, second item consumption failure information, where the second item consumption failure information is configured for indicating that a current item state of the target item belonging to the initiating object address is an item consumed state.

Specifically, the resource consumption event includes a third resource consumption event; the third resource consumption event corresponding to the transaction execution result is generated, where the third resource consumption event is configured for indicating that the current resource state of the target virtual resource is updated from the resource to-be-consumed state to the resource consumed state; and the third resource consumption event is broadcast to the service device corresponding to the initiating object address, so as to make the service device generate, according to the third resource consumption event, item consumption success information, where the item consumption success information is configured for indicating that the target item belonging to the initiating object address is consumed successfully.

Referring again to FIG. 6, operation S103 describes a scene in which the current resource state of the target virtual resource 303*d* is the resource consumed state, this operation is configured for describing a scene in which the current resource state of the target virtual resource 303*d* is the resource to-be-consumed state, and the specific process is as follows. The blockchain node 30*f* updates the current resource state (e.g., the resource to-be-consumed state) of the target virtual resource 303*d* to the resource consumed state if the current resource state of the target virtual resource 303*d* is the resource to-be-consumed state. Further, as shown in FIG. 6, the blockchain node 30*f* determines a resource consumption success result as the transaction execution result of the resource consumption task if the current resource state of the target virtual resource is successfully updated.

Further, the blockchain node 30*f* generates the third resource consumption event, the third resource consumption event being configured for indicating that the current resource state of the target virtual resource 303*d* is updated from the resource to-be-consumed state to the resource consumed state. The blockchain node 30*f* broadcasts the third resource consumption event to the service device 30*a*. After acquiring the third resource consumption event, the service device 30*a* may generate item consumption success information 60*b*. As illustrated in FIG. 6, the item consumption success information 60*b* is "a target item is successfully used", indicating the service object corresponding to the service device 30*a* that the target item is successfully consumed. The resource consumption event may refer to processing result description information generated in the process of consuming the target virtual resource, and the processing result description information may include two main types of processing results, one of which may indicate that the target virtual resource is successfully consumed in the process of executing the resource consumption task, and the other of which may indicate that the target virtual resource fails to be consumed in the process of executing the resource consumption task. The type of processing result indicating that the target virtual resource is successfully consumed may correspond to the third resource consumption event. Namely, by broadcasting the third resource consumption event, the service device may learn that the target virtual resource is successfully consumed. The type of processing result indicating a consumption failure may correspond to the first resource consumption event (the resource consumption event also includes the first resource consumption event) or the second resource consumption event. Namely, by broadcasting the first resource consumption event, the service device may learn that the consumption failure is caused by the initiating object address being different from the holding object address; or by broadcasting the second resource consumption event, the service device may learn that the target virtual resource has been consumed before the resource consumption task is executed, and therefore consumption of the target virtual resource fails.

Interfaces and controls shown in FIG. 5 and FIG. 6 are only some expressions for reference, and in actual service scenes, a developer may perform relevant design according to product requirements, and the embodiment of this application does not limit specific forms of the interfaces and the controls involved.

In the embodiments of this application, the resource consumption function is newly added in the smart contract, so that when the resource consumption task including the initiating object address and the target resource identifier is acquired, the resource consumption function can be called according to the resource consumption task, and the holding object address holding the target virtual resource can be determined in the blockchain based on the resource consumption function, where the target virtual resource refers to the virtual resource represented by the target resource identifier. Further, according to the initiating object address and the holding object address, the target virtual resource can be consumed to obtain the transaction execution result of the resource consumption task. Further, the resource consumption event corresponding to the transaction execution result is broadcast to the service device corresponding to the initiating object address, so as to make the service device perform, on the target item, service processing associated with the resource consumption event, where the target virtual resource is configured for representing the ownership of the target item. As can be seen above, the embodiment of this application provides a blockchain-based resource consumption method. According to the resource consumption method, when the target item is consumed, the target virtual resource configured for representing the ownership of the target item in the blockchain can be consumed in real time, and in this case, there is no need to perform destruction on the target virtual resource. Therefore, after the target item is successfully consumed, the blockchain still deposits the target virtual resource, and the ownership of the target item can be accurately traced through the consumed target virtual resource.

Figure 7:
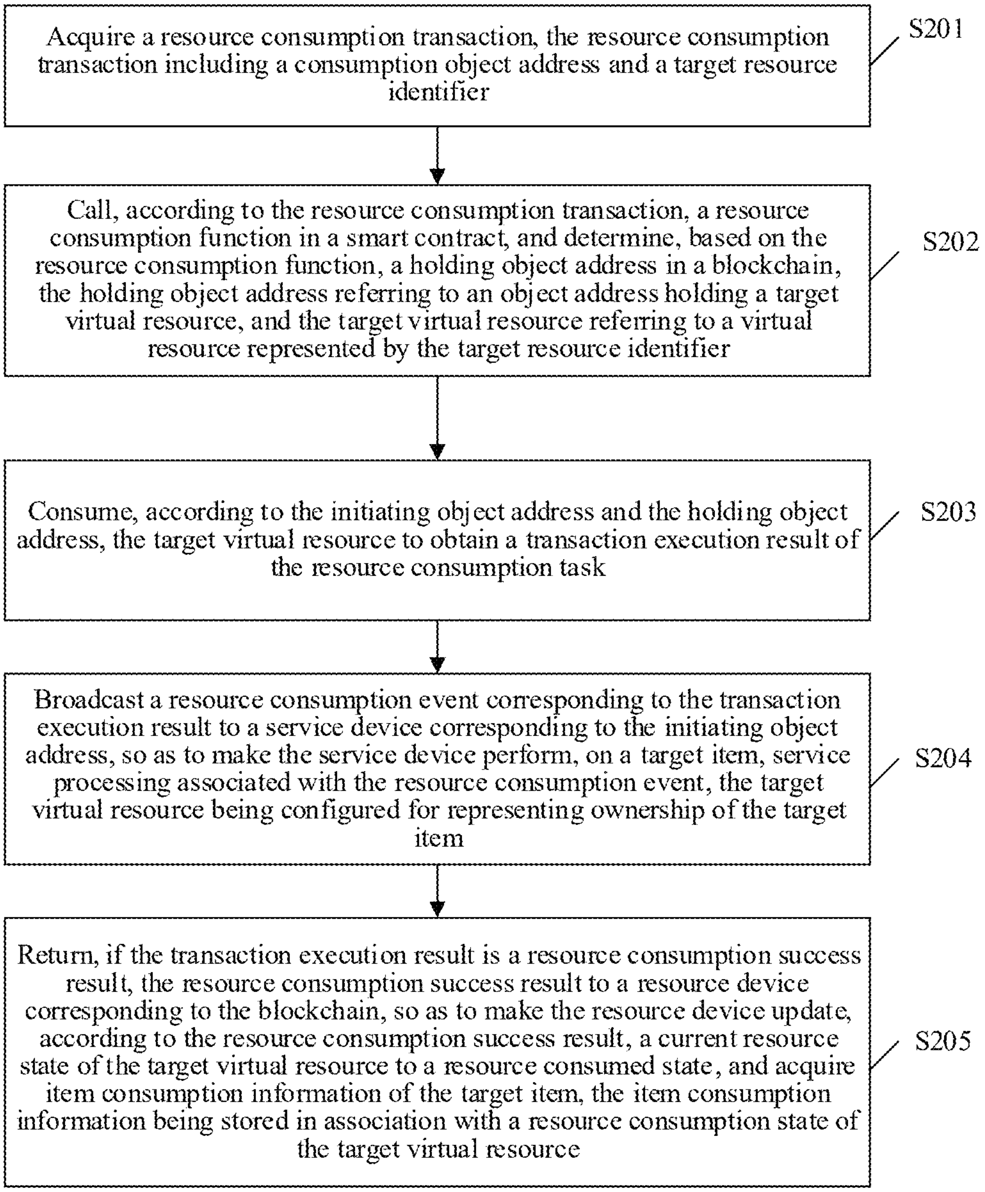
FIG. 7 is an example schematic flowchart II of a blockchain-based data processing method provided by an embodiment of this application.

Referring to FIG. 7, FIG. 7 is a schematic flowchart II of a blockchain-based data processing method provided by an embodiment of this application. The blockchain-based data processing method is executable by blockchain nodes (including the synchronization node and the consensus node in FIG. 1). As shown in FIG. 7, the method includes at least the following operations.

Operation S201: Acquire a resource consumption task, the resource consumption task including an initiating object address and a target resource identifier.

Figure 8:
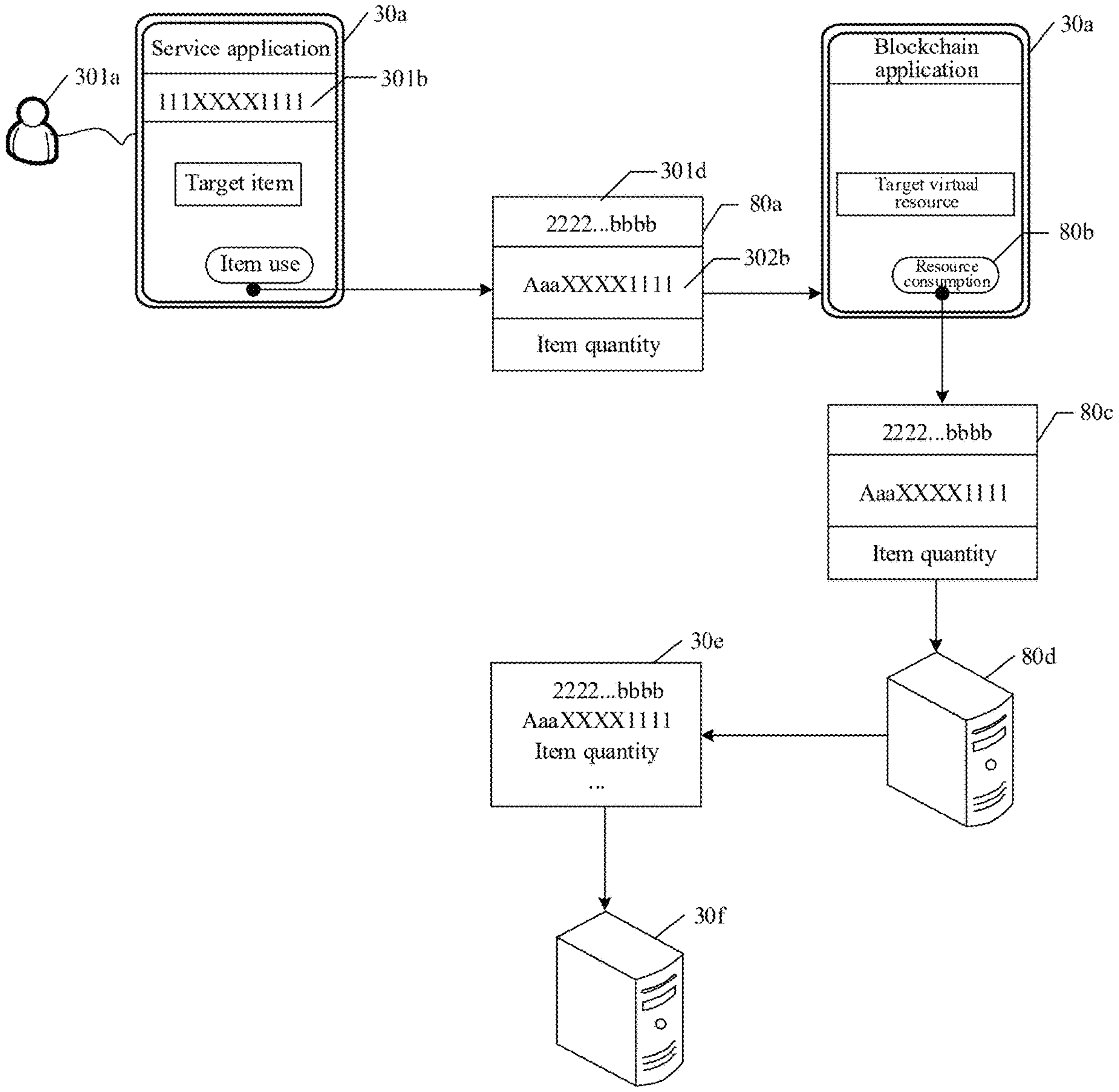
FIG. 8 is an example schematic flowchart V of a scene of blockchain-based data processing provided by an embodiment of this application.

Specifically, operation S101 in the above embodiment corresponding to FIG. 2 describes a scene in which the service device generates the resource consumption task and transmits the resource consumption task to the blockchain node when the service application provides the ability to compose transactions. The embodiment of this application is configured for describing a scene in which the service application does not provide the ability to compose transactions, referring to FIG. 8 together, FIG. 8 is a schematic flowchart V of a scene of blockchain-based data processing provided by an embodiment of this application. Identifiers such as the service object 301*a*, the service device 30*a*, and the service identity 301*b* have the same meaning as the above identifiers in FIG. 3-FIG. 6, and therefore the embodiment of this application will not repeat the meanings thereof one by one.

As shown in FIG. 8, since the service application does not have the ability to generate transactions, after the service device 30*a* determines the initiating object address 302*b* corresponding to the service identity 301*b*, and the target resource identifier 301*d* corresponding to the target item, the service device 30*a* may generate, according to the initiating object address 302*b*, the target resource identifier 301*d*, and the item quantity, an item consumption request 80*a*, and then send the item consumption request 80*a* to a blockchain application. The service device 30*a* may be installed with the blockchain application, the blockchain application is an application client with the function of loading the target virtual resource, and the blockchain application is an entry point for the blockchain to display an on-chain virtual resource, which may also be understood as an application created by the blockchain for the service application. The blockchain application may be a stand-alone client or an embedded sub-client integrated in a particular client (e.g., a social client, an instant messaging client, a multimedia client, and the like), without limitation herein.

Further, the service device 30*a* may display the target virtual resource and a resource consumption control 80*b* in the blockchain application. If the service object triggers the resource consumption control 80*b*, the service device 30*a* generates, in response to a trigger operation for the resource consumption control 80*b*, a resource consumption request 80*c* that includes the initiating object address 302*b*, the target resource identifier 301*d*, and the item quantity. The service device 30*a* sends the resource consumption request 80*c* to a resource server 80*d*, and the resource server 80*d* is a collection of multiple servers such as a backend server, a data processing server, and the like corresponding to the blockchain application installed for the service device 30*a*. If the service object 301*a* authorizes the resource server 80*d* to have the permission to use an address public-private key pair corresponding to the initiating object address 302*d*, then the resource server 80*d* may use an address private key corresponding to the initiating object address 302*d* to perform signature processing on the generated resource consumption task 30*e* to obtain a transaction signature as described in operation S101 of the above embodiment corresponding to FIG. 2, and then transmits the resource consumption task 30*e* carrying the transaction signature to the blockchain node 30*f*.

In some embodiments, if the service device 30*a* locally stores the address public-private key pair corresponding to the initiating object address 302*d*, and the service object 301*a* does not authorize the resource server 80*d* to have the permission to use the address public-private key pair, the service device 30*a* may locally generate, through the blockchain application, the resource consumption task 30*e*, then use the address private key to perform signature processing on the resource consumption task 30*e* to obtain a transaction signature, and next transmits the resource consumption task 30*e* carrying the transaction signature to the blockchain node 30*f*.

Operation S202: Call, according to the resource consumption task, a resource consumption function in a smart contract, and determine, based on the resource consumption function, a holding object address in a blockchain, the holding object address referring to an object address holding a target virtual resource, and the target virtual resource referring to a virtual resource represented by the target resource identifier.

With the increasing frequency of financial activities on the blockchain, on-chain virtual resources configured for representing the ownership of off-chain items are widely used on the blockchain. Current on-chain virtual resources (referred to as the virtual resource in the embodiment of this application) configured for representing the ownership of the off-chain items are applied in the fields, such as games, finance, souvenirs, and the like, on the chain. However, in some scenes, some virtual resources are to be consumed after use, for example, a ticket for a concert is to be consumed after a user attends a concert, but it is not to be destroyed because the service object can still hold the ticket that has been consumed, or collect the ticket that has been consumed. Based on this, the embodiment of this application provides a consumable digital asset scheme. In this scheme, a new function, e.g., the resource consumption function, is proposed, and based on the resource consumption function, the blockchain node may execute the resource consumption task, and consume the target virtual resource represented by the target resource identifier in the resource consumption task.

For the specific process of determining the holding object address in the blockchain, referring to operation S102 in the above embodiment corresponding to FIG. 2, which will not be repeated herein.

Operation S203: Consume, according to the initiating object address and the holding object address, the target virtual resource to obtain a transaction execution result of the resource consumption task.

Specifically, an address relationship between the initiating object address and the holding object address is determined; and a resource consumption failure result is determined as the transaction execution result of the resource consumption task if the address relationship is that the initiating object address is different from the holding object address.

Referring again to FIG. 5, if the initiating object address 302*b* (illustrated as AaaXXXX1111 in FIG. 5) is different from the holding object address 303*b* (illustrated as the object address 1 in FIG. 5), the blockchain node 30*f* may determine that the initiating object address 302*b* is an abnormal address, which does not hold the target virtual resource, and therefore determines the resource consumption failure result as the transaction execution result of the resource consumption task.

Operation S204: Broadcast a resource consumption event corresponding to the transaction execution result to a service device corresponding to the initiating object address, so as to make the service device perform, on the target item, service processing associated with the resource consumption event, the target virtual resource being configured for representing ownership of the target item.

Specifically, the resource consumption event includes a first resource consumption event; the first resource consumption event corresponding to the transaction execution result is generated, where the first resource consumption event is configured for indicating that the initiating object address is different from the holding object address; and the first resource consumption event is broadcast to the service device corresponding to the initiating object address, so as to make the service device generate, according to the first resource consumption event, first item consumption failure information, where the first item consumption failure information is configured for indicating that the initiating object address does not hold the target item.

Referring again to FIG. 5, since the initiating object address 302*b* (illustrated as AaaXXXX1111 in FIG. 5) is different from the holding object address 303*b* (illustrated as the object address 1 in FIG. 5), the blockchain node generates the first resource consumption event configured for indicating that the initiating object address 302*b* is different from the holding object address 303*b*, and broadcasts the first resource consumption event to the service device 30*a*. After acquiring the first resource consumption event, the service device 30*a* may generate first item consumption failure information 50*c*. As illustrated in FIG. 5, the first item consumption failure information 50*c* is "a login identity does not hold a target item", indicating the service object corresponding to the service device 30*a* that the currently logged-in service identity (illustrated as 111XXXX1111 in FIG. 5) does not have the right to use the target item because the target item does not belong to the currently logged-in service identity.

Operation S205: Return, if the transaction execution result is a resource consumption success result, the resource consumption success result to a resource device corresponding to the blockchain, so as to make the resource device update, according to the resource consumption success result, the current resource state of the target virtual resource to a resource consumed state, and acquire item consumption information of the target item, the item consumption information being stored in association with a resource consumption state of the target virtual resource.

Specifically, the resource device may include a service device installed with a blockchain application and a resource server corresponding to the blockchain application.

Figure 9:
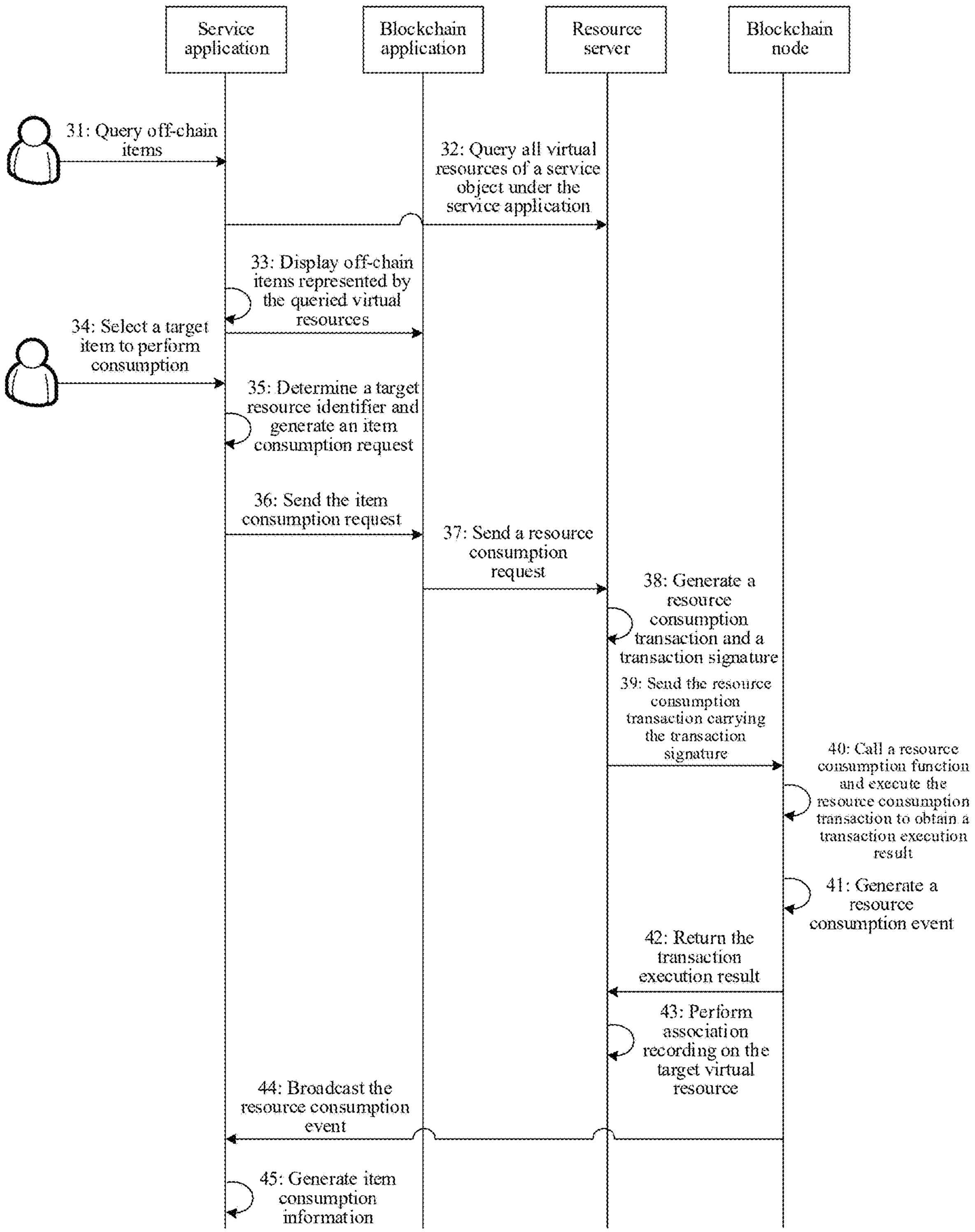
FIG. 9 is an example schematic diagram of interaction of a blockchain-based data processing method provided by an embodiment of this application.

Referring to FIG. 9 together for the above process, FIG. 9 is a schematic diagram of interaction of a blockchain-based data processing method provided by an embodiment of this application. As shown in FIG. 9, the data processing method may include the following operations. Operation S31: The service object queries an off-chain item in the service application. The embodiment of this application does not limit the specific type of the off-chain item, which may be any type of item that can be consumed and can be collected, including but not limited to a movie ticket, a concert ticket, an electronic game prop, and the like.

Operation S32: The service application queries the resource server for virtual resources of the service object under the service application. The service device installed with the service application may log in a service identity of the service object, so the service device bound with the service identity may query the resource server for the virtual resources under the service identity, and the virtual resources in the embodiment of this application are on-chain virtual resources, which are configured for representing the ownership of off-chain resources (e.g., the off-chain item). Subsequently, the resource server returns the queried virtual resource to the service device.

Operation S33: The service application displays the off-chain item represented by the queried virtual resource. The service application may also display a target resource identifier corresponding to the off-chain item, e.g., an identifier corresponding to the target virtual resource.

Operation S34: The service object selects a target item in the service application to perform consumption. The embodiment of this application refers to the off-chain item selected by the service object as the target item, and the example of this application does not limit the quantity of the target item, which may be determined according to the actual application scenarios, and is usually 1.

Operation S35: The service application determines the target resource identifier and generates an item consumption request. If the service application provides the ability to generate transactions, the service device installed with the service application may locally generate a resource consumption task that includes the target resource identifier, the initiating object address, and the item quantity. If the service application does not provide the ability to generate transactions, the service device generates an item consumption request that includes the target resource identifier, the initiating object address, and the item quantity.

Operation S36: The service application sends the item consumption request to the blockchain application. The blockchain application is an entry point for the virtual resource in the blockchain. If the blockchain application provides the ability to generate transactions, the service device installed with the blockchain application may locally generate the resource consumption task that includes the target resource identifier, the initiating object address, and the item quantity. If the blockchain application does not provide the ability to generate transactions, the service device generates the resource consumption request that includes the target resource identifier, the initiating object address, and the item quantity. Specifically, the service object logs in the blockchain application, the blockchain application confirms consumption of the target virtual resource through the service object, and a front-end of the blockchain application initiates the resource consumption request for the target virtual resource.

Operation S37: The blockchain application sends the resource consumption request to the resource server.

Operation S38: The resource server generates the resource consumption task, and a transaction signature. The resource server first verifies the identity of the service object through the service identity, and then signs, after the verification is passed, the resource consumption task according to an address private key corresponding to the initiating object address (in the scene of authorization by the service object), and obtains the transaction signature. Relevant parameters contained in the resource consumption task include the initiating object address, the target resource identifier, and the item quantity.

Operation S39: The resource server sends the resource consumption task carrying the transaction signature to the blockchain node.

Operation S40: The blockchain node calls the resource consumption function and executes the resource consumption task to obtain the transaction execution result. The blockchain node calls the resource consumption function, and executes the resource consumption task, including first verifying whether the holding object address of the target virtual resource is the initiating object address, and subsequently executing the consumption logic of the target virtual resource, for the specific process, referring to the above embodiment corresponding to FIG. 2 and the above embodiment corresponding to FIG. 7.

Operation S41: The blockchain node generates a resource consumption event. The blockchain node generates, according to the transaction execution result, a corresponding resource consumption event. Specifically, when the initiating object address is different from the holding object address, the blockchain node determines a resource consumption failure result as the transaction execution result, and generates a first resource consumption event configured for indicating that the initiating object address is different from the holding object address. When the initiating object address is the same as the holding object address and the current resource state of the target virtual resource is a resource consumed state, the blockchain node determines the resource consumption failure result as the transaction execution result and generates a second resource consumption event configured for indicating that the current resource state of the target virtual resource is the resource consumed state. When the initiating object address is the same as the holding object address and the current resource state of the target virtual resource is a resource to-be-consumed state, the blockchain node updates the current resource state to the resource consumed state, and then, upon successfully updated, determines a resource consumption success result as the transaction execution result and generates a third resource consumption event configured for indicating that the current resource state of the target virtual resource is successfully updated to the resource consumed state.

Operation S42: The blockchain node returns the transaction execution result to the resource server.

Operation S43: The resource server records the association of the target virtual resource. The embodiment of this application does not perform destruction on the consumed target virtual resource, but updates the resource consumption state, so the resource server can synchronize the resource state of the target virtual resource on the blockchain.

Operation S44: The blockchain node broadcasts the resource consumption event. Operation S42 may be executed earlier than operation S44, or later than operation S44, or the two operations may be executed in parallel, which is not limited by an example of this application.

Operation S45: The service application generates item consumption information. The service application may generate, according to the resource consumption events of different situations, different types of item consumption information, specifically referring to the description in the above embodiment corresponding to FIG. 2 and in the above embodiment corresponding to FIG. 7.

In the embodiments of this application, the resource consumption function is newly added in the smart contract, so that when the resource consumption task including the initiating object address and the target resource identifier is acquired, the resource consumption function can be called according to the resource consumption task, and the holding object address holding the target virtual resource can be determined in the blockchain based on the resource consumption function, where the target virtual resource refers to the virtual resource represented by the target resource identifier. Further, according to the initiating object address and the holding object address, the target virtual resource can be consumed to obtain the transaction execution result of the resource consumption task. Further, the resource consumption event corresponding to the transaction execution result is broadcast to the service device corresponding to the initiating object address, so as to make the service device perform, on the target item, service processing associated with the resource consumption event, where the target virtual resource is configured for representing the ownership of the target item. As can be seen above, the embodiment of this application provides a blockchain-based resource consumption method. According to the resource consumption method, when the target item is consumed, the target virtual resource configured for representing the ownership of the target item in the blockchain can be consumed in real time, and in this case, there is no need to perform destruction on the target virtual resource. Therefore, after the target item is successfully consumed, the blockchain still deposits the target virtual resource, and the ownership of the target item can be accurately traced through the consumed target virtual resource.

Figure 10:
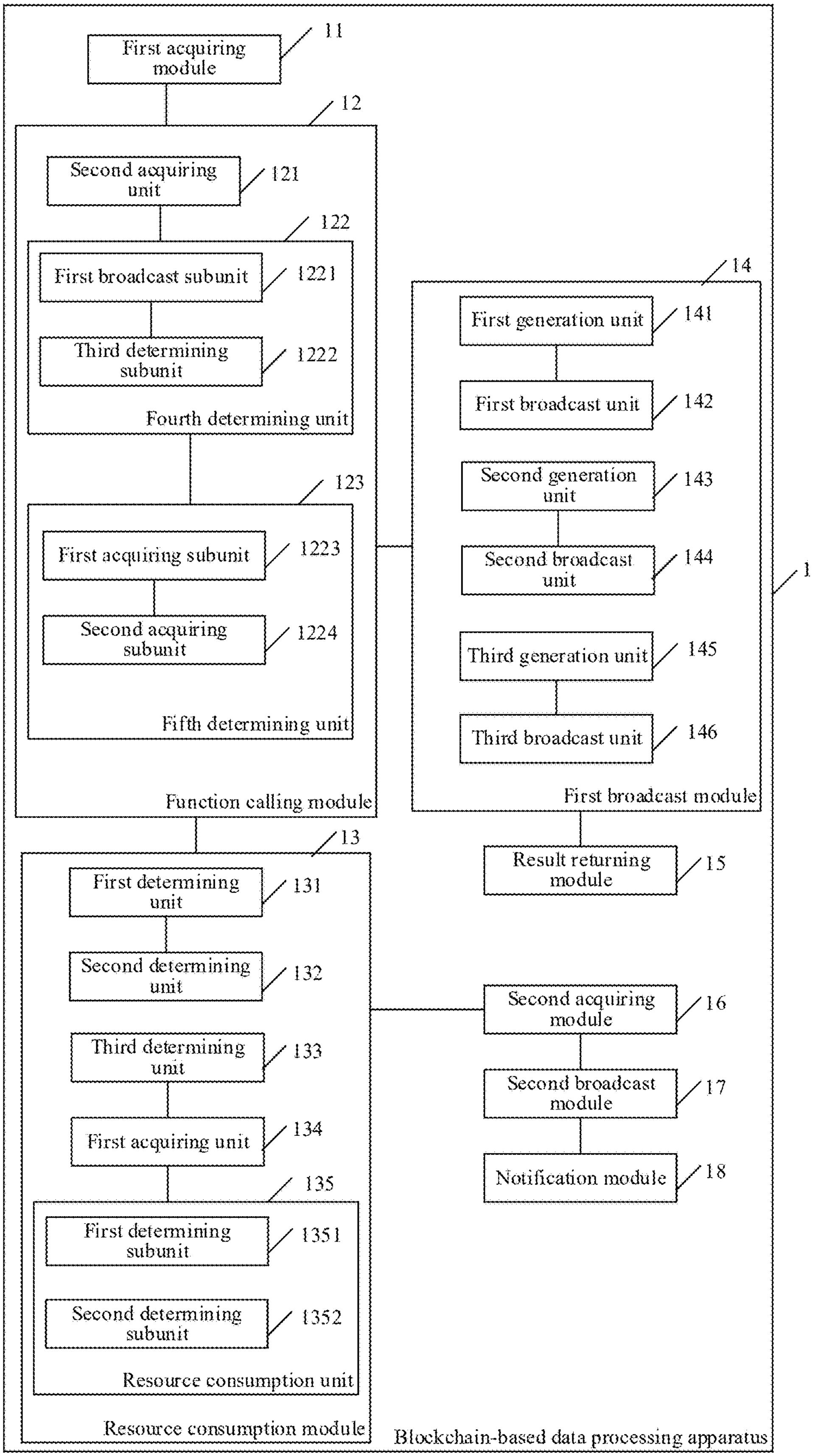
FIG. 10 is an example schematic structural diagram of a blockchain-based data processing apparatus provided by an embodiment of this application.

Further, referring to FIG. 10, FIG. 10 is a schematic structural diagram of a blockchain-based data processing apparatus provided by an embodiment of this application. The above blockchain-based data processing apparatus 1 may be configured to execute corresponding operations in the method provided by the embodiment of this application. As shown in FIG. 10, the blockchain-based data processing apparatus 1 may include: a first acquiring module 11, a function calling module 12, a resource consumption module 13, and a first broadcast module 14.

The first acquiring module 11 is configured to acquire a resource consumption task, the resource consumption task including an initiating object address and a target resource identifier.

The function calling module 12 is configured to call, according to the resource consumption task, a resource consumption function in a smart contract, and determine, based on the resource consumption function, a holding object address in a blockchain, the holding object address referring to an object address holding a target virtual resource, and the target virtual resource referring to a virtual resource represented by the target resource identifier.

The resource consumption module 13 is configured to consume, according to the initiating object address and the holding object address, the target virtual resource to obtain a transaction execution result of the resource consumption task.

The first broadcast module 14 is configured to broadcast a resource consumption event corresponding to the transaction execution result to a service device corresponding to the initiating object address, so as to make the service device perform, on a target item, service processing associated with the resource consumption event, the target virtual resource being configured for representing ownership of the target item.

The specific functional implementations of the first acquiring module 11, the function calling module 12, the resource consumption module 13, and the first broadcast module 14 may refer to operation S101 to operation S104 in the above embodiment corresponding to FIG. 2, and will not be repeated herein.

Referring again to FIG. 10, the resource consumption module 13 may include: a first determining unit 131 and a second determining unit 132.

The first determining unit 131 is configured to determine an address relationship between the initiating object address and the holding object address.

The second determining unit 132 is configured to determine a resource consumption failure result as the transaction execution result of the resource consumption task if the address relationship is that the initiating object address is different from the holding object address, the resource consumption event including a first resource consumption event.

The first broadcast module 14 may include: a first generation unit 141 and a first broadcast unit 142.

The first generation unit 141 is configured to generate the first resource consumption event corresponding to the transaction execution result, the first resource consumption event being configured for indicating that the initiating object address is different from the holding object address.

The first broadcast unit 142 is configured to broadcast the first resource consumption event to the service device corresponding to the initiating object address, so as to make the service device generate, according to the first resource consumption event, first item consumption failure information, the first item consumption failure information being configured for indicating that the initiating object address does not hold the target item.

The specific functional implementations of the first determining unit 131, the second determining unit 132, the first generation unit 141, and the first broadcast unit 142 may refer to operation S203 to operation S204 in the above embodiment corresponding to FIG. 7, and will not be repeated herein.

Referring again to FIG. 10, the resource consumption module 13 may include: a third determining unit 133, a first acquiring unit 134, and a resource consumption unit 135.

The third determining unit 133 is configured to determine the address relationship between the initiating object address and the holding object address.

The first acquiring unit 134 is configured to acquire a current resource state of the target virtual resource if the address relationship is that the initiating object address is the same as the holding object address.

The resource consumption unit 135 is configured to consume, according to the current resource state of the target virtual resource, the target virtual resource to obtain the transaction execution result of the resource consumption task.

The specific functional implementations of the third determining unit 133, the first acquiring unit 134, and the resource consumption unit 135 may refer to operation S103 in the above embodiment corresponding to FIG. 2, and will not be repeated herein.

Referring again to FIG. 10, the resource consumption unit 135 may include: a first determining subunit 1351.

The first determining subunit 1351 is configured to determine the resource consumption failure result as the transaction execution result of the resource consumption task if the current resource state of the target virtual resource is a resource consumed state, the resource consumption event including a second resource consumption event.

The first broadcast module 14 may include: a second generation unit 143 and a second broadcast unit 144.

The second generation unit 143 is configured to generate the second resource consumption event corresponding to the transaction execution result, the second resource consumption event being configured for indicating that the current resource state of the target virtual resource is the resource consumed state.

The second broadcast unit 144 is configured to broadcast the second resource consumption event to the service device corresponding to the initiating object address, so as to make the service device generate, according to the second resource consumption event, second item consumption failure information, the second item consumption failure information being configured for indicating that a current item state of the target item belonging to the initiating object address is an item consumed state.

The specific functional implementations of the first determining subunit 1351, the second generation unit 143, and the second broadcast unit 144 may refer to operation S103 to operation S104 in the above embodiment corresponding to FIG. 2, and will not be repeated herein.

Referring again to FIG. 10, the resource consumption unit 135 may include: a second determining subunit 1352.

The second determining subunit 1352 is configured to update the current resource state of the target virtual resource to the resource consumed state if the current resource state of the target virtual resource is a resource to-be-consumed state.

The second determining subunit 1352 is further configured to determine a resource consumption success result as the transaction execution result of the resource consumption task if the current resource state of the target virtual resource is successfully updated, the resource consumption event including a third resource consumption event.

The first broadcast module 14 may include: a third generation unit 145 and a third broadcast unit 146.

The third generation unit 145 is configured to generate the third resource consumption event corresponding to the transaction execution result, the third resource consumption event being configured for indicating that the current resource state of the target virtual resource is updated from the resource to-be-consumed state to the resource consumed state.

The third broadcast unit 146 is configured to broadcast the third resource consumption event to the service device corresponding to the initiating object address, so as to make the service device generate, according to the third resource consumption event, item consumption success information, the item consumption success information being configured for indicating that the target item belonging to the initiating object address is consumed successfully.

The specific functional implementations of the second determining subunit 1352, the third generation unit 145, and the third broadcast unit 146 may refer to operation S103 to operation S104 in the above embodiment corresponding to FIG. 2, and will not be repeated herein.

Referring again to FIG. 10, the function calling module 12 may include: a second acquiring unit 121, a fourth determining unit 122, and a fifth determining unit 123.

The second acquiring unit 121 is configured to acquire a first index key-value pair in the blockchain, the first index key-value pair including a first index key generated using a virtual resource and a first index value generated using a resource identifier.

The fourth determining unit 122 is configured to acquire, according to the first index key-value pair and the target resource identifier, the target virtual resource.

The fifth determining unit 123 is configured to acquire a holding object address of the target virtual resource.

The specific functional implementations of the second acquiring unit 121 and the fourth determining unit 122 may refer to operation S102 in the above embodiment corresponding to FIG. 2, and will not be repeated herein.

Referring again to FIG. 10, the fourth determining unit 122 may include: a first broadcast subunit 1221 and a third determining subunit 1222.

The first broadcast subunit 1221 is configured to broadcast a resource abnormality event to the service device corresponding to the initiating object address if a first target index value including the target resource identifier does not exist in the first index key-value pair, so as to make the service device generate, according to the resource abnormality event, item abnormality information, the item abnormality information being configured for indicating that the target item belongs to an abnormal item.

The third determining subunit 1222 is configured to determine a virtual resource in a first target index key corresponding to the first target index value as the target virtual resource if the first target index value including the target resource identifier exists in the first index key-value pair.

The specific functional implementations of the first broadcast subunit 1221 and the third determining subunit 1222 may refer to operation S102 in the above embodiment corresponding to FIG. 2, and will not be repeated herein.

Referring again to FIG. 10, the fifth determining unit 123 may include: a first acquiring subunit 1223 and a second acquiring subunit 1224.

The first acquiring subunit 1223 is configured to acquire a second index key-value pair in the blockchain, the second index key-value pair including a second index key generated using an object address and a second index value generated using a virtual resource.

The second acquiring subunit 1224 is configured to determine, in the second index key-value pair, a second index value including the target virtual resource as a second target index value, and determine an object address in a second index key corresponding to the second target index value as the holding object address.

The specific functional implementations of the first acquiring subunit 1223 and the second acquiring subunit 1224 may refer to operation S102 in the above embodiment corresponding to FIG. 2, and will not be repeated herein.

Referring again to FIG. 10, the blockchain-based data processing apparatus 1 may further include: a result returning module 15.

The result returning module 15 is configured to return, if the transaction execution result is a resource consumption success result, the resource consumption success result to a resource device corresponding to the blockchain, so as to make the resource device update, according to the resource consumption success result, the current resource state of the target virtual resource to the resource consumed state, and acquire item consumption information of the target item, the item consumption information being stored in association with a resource consumption state of the target virtual resource.

The specific functional implementation of the result returning module 15 may refer to operation S205 in the above embodiment corresponding to FIG. 7, and will not be repeated herein.

Referring again to FIG. 10, the resource consumption task includes a transaction signature.

The blockchain-based data processing apparatus 1 may further include: a second acquiring module 16, a second broadcast module 17, and an operation executing module 18.

The second acquiring module 16 is configured to acquire an address public key corresponding to the initiating object address, use the address public key to perform signature verification on the transaction signature, and obtain a first digital digest.

The second broadcast module 17 is configured to generate a second digital digest corresponding to the resource consumption task, generate, if the first digital digest is different from the second digital digest, a transaction abnormality event configured for indicating that the resource consumption task is an abnormal transaction, and broadcast the transaction abnormality event to the service device, so as to make the service device perform, according to the transaction abnormality event, validity verification on the resource consumption task.

The operation executing module 18 is configured to execute, if the first digital digest is the same as the second digital digest, the operation of calling, according to the resource consumption task, the resource consumption function in the smart contract.

The specific functional implementations of the second acquiring module 16, the second broadcast module 17, and the operation executing module 18 may refer to operation S101 in the above embodiment corresponding to FIG. 2, and will not be repeated herein.

In the embodiments of this application, the resource consumption function is newly added in the smart contract, so that when the resource consumption task including the initiating object address and the target resource identifier is acquired, the resource consumption function can be called according to the resource consumption task, and the holding object address holding the target virtual resource can be determined in the blockchain based on the resource consumption function, where the target virtual resource refers to the virtual resource represented by the target resource identifier. Further, according to the initiating object address and the holding object address, the target virtual resource can be consumed to obtain the transaction execution result of the resource consumption task. Further, the resource consumption event corresponding to the transaction execution result is broadcast to the service device corresponding to the initiating object address, so as to make the service device perform, on the target item, service processing associated with the resource consumption event, where the target virtual resource is configured for representing the ownership of the target item. As can be seen above, the embodiment of this application provides a blockchain-based resource consumption method. According to the resource consumption method, when the target item is consumed, the target virtual resource configured for representing the ownership of the target item in the blockchain can be consumed in real time, and in this case, there is no need to perform destruction on the target virtual resource. Therefore, after the target item is successfully consumed, the blockchain still deposits the target virtual resource, and the ownership of the target item can be accurately traced through the consumed target virtual resource.

Figure 11:
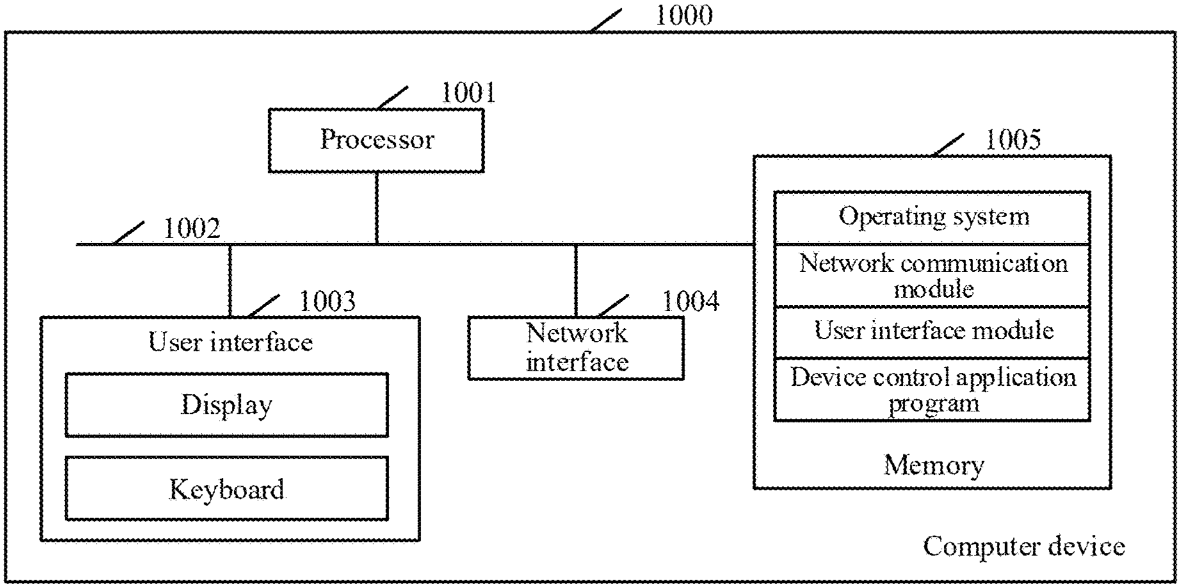
FIG. 11 is an example schematic structural diagram of a computer device provided by an embodiment of this application.

Further, referring to FIG. 11, FIG. 11 is a schematic structural diagram of a computer device provided by an embodiment of this application. As shown in FIG. 11, the computer device 1000 may include: at least one processor 1001 such as central processing unit (CPU), at least one network interface 1004, a user interface 1003, a memory 1005, and at least one communication bus 1002. The communication bus 1002 is configured to implement connection and communication between these components. In some embodiments, the user interface 1003 may include a display and a keyboard, and the network interface 1004 may include a standard wired interface and a standard wireless interface (such as a WI-FI interface). The memory 1005 may be a high-speed random access memory (RAM) memory, or may be a non-volatile memory, for example, at least one magnetic disk memory. In some embodiments, the memory 1005 may be at least one storage apparatus that is located far away from the foregoing processor 1001. As shown in FIG. 11, the memory 1005 used as a computer storage medium may include an operating system, a network communication module, a user interface module, and a device control application program.

In the computer device 1000 shown in FIG. 11, the network interface 1004 may provide a network communication function. The user interface 1003 is mainly configured to provide an input interface for a user. The processor 1001 may be configured to call the device control application program stored in the memory 1005 to implement:

acquiring a resource consumption task, the resource consumption task including an initiating object address and a target resource identifier;

calling, according to the resource consumption task, a resource consumption function in a smart contract, and determining, based on the resource consumption function, a holding object address in the blockchain, the holding object address referring to an object address holding a target virtual resource, and the target virtual resource referring to a virtual resource represented by the target resource identifier;

consuming, according to the initiating object address and the holding object address, the target virtual resource to obtain a transaction execution result of the resource consumption task; and broadcasting a resource consumption event corresponding to the transaction execution result to a service device corresponding to the initiating object address, so as to make the service device perform, on a target item, service processing associated with the resource consumption event, the target virtual resource being configured for representing ownership of the target item.

The computer device 1000 described in the embodiment of this application may implement the description of the blockchain-based data processing method or apparatus in the foregoing embodiments, and will not be repeated herein. In addition, the description of beneficial effects of the same method will not repeated herein.

An embodiment of this application further provides a computer-readable storage medium, having computer programs stored therein, the computer program, when executed by a processor, implementing the description of the blockchain-based data processing method or apparatus in the foregoing embodiments, which will not be repeated herein. In addition, the description of beneficial effects of the same method will not repeated herein.

The above computer-readable storage medium may be the blockchain-based data processing apparatus provided by any one of the foregoing embodiments or an internal storage unit of the above computer device, such as a hard disk or internal memory of the computer device. The computer-readable storage medium may also be an external storage device of the computer device, for example, a plug-in type hard disk being equipped on the computer device, a smart media card (SMC), a secure digital (SD) card, a flash card, and the like. Further, the computer-readable storage medium may further include both the internal storage unit of the computer device and an external storage device. The computer-readable storage medium is configured to store other programs and data needed for the computer program and the computer device. The computer-readable storage medium may be also configured to temporarily store the data that has been outputted or will be outputted.

An embodiment of this application further provides a computer program product, including computer programs, the computer program being stored in a computer-readable storage medium. The processor of the computer device reads the computer program from the computer-readable storage medium, and the processor executes the computer program, so that the computer device can execute the description of the blockchain-based data processing method or apparatus in the foregoing embodiments, which will not be repeated herein. In addition, the description of beneficial effects of the same method will not be repeated herein.

The terms "first" and "second" in the specification, claims, and accompanying drawings of the embodiments of this application are used for distinguishing different objects and are not used for describing a specific sequence. In addition, the term "include" and any variant thereof are intended to cover a non-exclusive inclusion. For example, a process, method, apparatus, product or device that includes a series of operations or units is not limited to the listed operations or modules, and instead, in some embodiments, includes an operation or module that is not listed, or further in some embodiments, includes another operation or unit that is intrinsic to the process, method, apparatus, product, or device.

A person of ordinary skill in the art may be aware that, in combination with the examples described in the embodiments disclosed in this specification, units and algorithm operations may be implemented by electronic hardware, computer software, or a combination thereof. To clearly describe the interchangeability between the hardware and the software, the foregoing has generally described compositions and operations of each example according to functions. Whether the functions are executed in a mode of hardware or software depends on particular applications and design constraint conditions of the technical solution. A person skilled in the art may use different methods to implement the described functions for each particular application, but it shall not be considered that the implementation goes beyond the scope of this application.

What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. A blockchain-based data processing method, comprising:

acquiring a resource consumption task, the resource consumption task comprising an initiating object address and a target resource identifier;

calling, according to the resource consumption task, a resource consumption function in a smart contract, and determining, based on the resource consumption function, a holding object address, the holding object address being an object address holding a target virtual resource, and the target virtual resource being a virtual resource represented by the target resource identifier;

consuming, according to the initiating object address and the holding object address, the target virtual resource and obtaining a transaction execution result of the resource consumption task; and broadcasting a resource consumption event corresponding to the transaction execution result to a service device corresponding to the initiating object address, wherein the service device performs, on a target item, service processing associated with the resource consumption event, the target virtual resource being configured to represent ownership of the target item.

2. The blockchain-based data processing method according to claim 1, wherein consuming, according to the initiating object address and the holding object address, the target virtual resource and obtaining a transaction execution result of the resource consumption task comprises:

determining an address relationship between the initiating object address and the holding object address.

3. The blockchain-based data processing method according to claim 2, wherein determining an address relationship between the initiating object address and the holding object address further comprises:

determining a resource consumption failure result as the transaction execution result of the resource consumption task if the address relationship is that the initiating object address is different from the holding object address; and broadcasting a resource consumption event corresponding to the transaction execution result to a service device corresponding to the initiating object address, the resource consumption event comprising a first resource consumption event, wherein the service device performs, on a target item, service processing associated with the resource consumption event comprises:

generating the first resource consumption event corresponding to the transaction execution result, the first resource consumption event being configured to indicate that the initiating object address is different from the holding object address; and broadcasting the first resource consumption event to the service device corresponding to the initiating object address, wherein the service device generates, according to the first resource consumption event, a first item consumption failure information, the first item consumption failure information being configured to indicate that the initiating object address does not hold the target item.

4. The blockchain-based data processing method according to claim 2, wherein determining an address relationship between the initiating object address and the holding object address further comprises:

acquiring a current resource state of the target virtual resource if the address relationship is that the initiating object address is the same as the holding object address; and consuming, according to the current resource state of the target virtual resource, the target virtual resource and obtaining the transaction execution result of the resource consumption task.

5. The blockchain-based data processing method according to claim 4, wherein consuming, according to the current resource state of the target virtual resource, the target virtual resource and obtaining the transaction execution result of the resource consumption task comprises:

determining a resource consumption failure result as the transaction execution result of the resource consumption task if the current resource state of the target virtual resource is a resource consumed state; and broadcasting a resource consumption event corresponding to the transaction execution result to a service device corresponding to the initiating object address, the resource consumption event comprising a second resource consumption event, wherein the service device performs, on a target item, service processing associated with the resource consumption event comprises:

generating the second resource consumption event corresponding to the transaction execution result, the second resource consumption event being configured to indicate that the current resource state of the target virtual resource is the resource consumed state; and broadcasting the second resource consumption event to the service device corresponding to the initiating object address, wherein the service device generates, according to the second resource consumption event, second item consumption failure information, the second item consumption failure information being configured to indicate that a current item state of the target item belonging to the initiating object address is an item consumed state.

6. The blockchain-based data processing method according to claim 4, wherein consuming, according to the current resource state of the target virtual resource, the target virtual resource and obtaining the transaction execution result of the resource consumption task comprises:

updating the current resource state of the target virtual resource to a resource consumed state if the current resource state of the target virtual resource is a resource to-be-consumed state;

determining a resource consumption success result as the transaction execution result of the resource consumption task if the current resource state of the target virtual resource is updated; and broadcasting a resource consumption event corresponding to the transaction execution result to a service device corresponding to the initiating object address, the resource consumption event comprising a third resource consumption event, wherein the service device performs, on a target item, service processing associated with the resource consumption event comprises:

generating the third resource consumption event corresponding to the transaction execution result, the third resource consumption event being configured to indicate that the current resource state of the target virtual resource is updated from the resource to-be-consumed state to the resource consumed state; and broadcasting the third resource consumption event to the service device corresponding to the initiating object address, wherein the service device generates, according to the third resource consumption event, item consumption success information, the item consumption success information being configured to indicate that the target item belonging to the initiating object address is consumed.

7. The blockchain-based data processing method according to claim 1, wherein determining a holding object address comprises:

acquiring a first index key-value pair, the first index key-value pair comprising a first index key according to a virtual resource and a first index value according to a resource identifier;

acquiring, according to the first index key-value pair and the target resource identifier, the target virtual resource; and acquiring a holding object address of the target virtual resource.

8. The blockchain-based data processing method according to claim 7, wherein acquiring, according to the first index key-value pair and the target resource identifier, the target virtual resource comprises:

broadcasting a resource abnormality event to the service device corresponding to the initiating object address if a first target index value comprising the target resource identifier does not exist in the first index key-value pair, wherein the service device generates, according to the resource abnormality event, item abnormality information, the item abnormality information being configured to indicate that the target item belongs to an abnormal item; and determining a virtual resource in a first target index key corresponding to the first target index value as the target virtual resource if the first target index value comprising the target resource identifier exists in the first index key-value pair.

9. The blockchain-based data processing method according to claim 7, wherein acquiring a holding object address of the target virtual resource comprises:

acquiring a second index key-value pair, the second index key-value pair comprising a second index key according to an object address and a second index value according to a virtual resource; and determining, in the second index key-value pair, a second index value comprising the target virtual resource as a second target index value, and determining an object address in a second index key corresponding to the second target index value as the holding object address.

10. The blockchain-based data processing method according to claim 1, further comprising:

returning, if the transaction execution result is a resource consumption success result, the resource consumption success result to a resource device, wherein the resource device updates, according to the resource consumption success result, a current resource state of the target virtual resource to a resource consumed state, and acquiring item consumption information of the target item, the item consumption information being stored in association with a resource consumption state of the target virtual resource.

11. The blockchain-based data processing method according to claim 1, wherein:

the resource consumption task further comprises a transaction signature; and the method further comprises:

acquiring an address public key corresponding to the initiating object address;

performing, according to the address public key, signature verification on the transaction signature and obtaining a first digital digest;

generating a second digital digest corresponding to the resource consumption task;

generating, if the first digital digest is different from the second digital digest, a transaction abnormality event configured to indicate that the resource consumption task is an abnormal transaction;

broadcasting the transaction abnormality event to the service device, wherein the service device performs, according to the transaction abnormality event, validity verification on the resource consumption task; and executing, if the first digital digest is the same as the second digital digest, an operation of calling, according to the resource consumption task, a resource consumption function in a smart contract.

12. A non-transitory computer readable medium storing a plurality of instructions, wherein the plurality of instructions, when executed by a processor, configure the processor to:

acquire a resource consumption task, the resource consumption task comprising an initiating object address and a target resource identifier;

call, according to the resource consumption task, a resource consumption function in a smart contract, and determine, based on the resource consumption function, a holding object address, the holding object address being an object address holding a target virtual resource, and the target virtual resource being a virtual resource represented by the target resource identifier;

consume, according to the initiating object address and the holding object address, the target virtual resource and obtain a transaction execution result of the resource consumption task; and broadcast a resource consumption event corresponding to the transaction execution result to a service device corresponding to the initiating object address, wherein the service device performs, on a target item, service processing associated with the resource consumption event, the target virtual resource being configured to represent ownership of the target item.

13. The non-transitory computer readable medium according to claim 12, wherein the plurality of instructions, when being executed to configure the processor to consume, according to the initiating object address and the holding object address, the target virtual resource and obtaining the transaction execution result of the resource consumption task, configure the processor to:

determine an address relationship between the initiating object address and the holding object address.

14. The non-transitory computer readable medium according to claim 12, wherein the plurality of instructions, when being executed to configure the processor to determine the holding object address, configure the processor to:

acquire a first index key-value pair, the first index key-value pair comprising a first index key according to a virtual resource and a first index value according to a resource identifier;

acquire, according to the first index key-value pair and the target resource identifier, the target virtual resource; and acquire a holding object address of the target virtual resource.

15. The non-transitory computer readable medium according to claim 12, wherein the plurality of instructions, when being executed by the processor, further configures the processor to:

return, if the transaction execution result is a resource consumption success result, the resource consumption success result to a resource device, wherein the resource device updates, according to the resource consumption success result, a current resource state of the target virtual resource to a resource consumed state, and acquire item consumption information of the target item, the item consumption information being stored in association with a resource consumption state of the target virtual resource.

16. The non-transitory computer readable medium according to claim 12, wherein the resource consumption task further comprises a transaction signature; and the plurality of instructions, when being executed by the processor, further configures the processor to:

acquire an address public key corresponding to the initiating object address;

perform, according to the address public key, verification on the transaction signature, and obtain a first digital digest;

generate a second digital digest corresponding to the resource consumption task;

generate, if the first digital digest is different from the second digital digest, a transaction abnormality event configured to indicate that the resource consumption task is an abnormal transaction;

broadcast the transaction abnormality event to the service device, wherein the service device performs, according to the transaction abnormality event, validity verification on the resource consumption task; and execute, if the first digital digest is the same as the second digital digest, an operation of calling, according to the resource consumption task, a resource consumption function in a smart contract.

17. A computer device, comprising:

a processor;

a network interface in communication with the processor; and a memory in communication with the processor and storing a plurality of instructions, the plurality of instructions, when executed by the processor, configure the processor to:

acquire a resource consumption task, the resource consumption task comprising an initiating object address and a target resource identifier;

call, according to the resource consumption task, a resource consumption function in a smart contract, and determine, based on the resource consumption function, a holding object address, the holding object address being an object address holding a target virtual resource, and the target virtual resource being a virtual resource represented by the target resource identifier;

consume, according to the initiating object address and the holding object address, the target virtual resource and obtain a transaction execution result of the resource consumption task; and broadcast a resource consumption event corresponding to the transaction execution result to a service device corresponding to the initiating object address, wherein the service device performs, on a target item, service processing associated with the resource consumption event, the target virtual resource being configured to represent ownership of the target item.

18. The computer device according to claim 17, wherein the processor, when being configured to execute the plurality of instructions to consume, according to the initiating object address and the holding object address, the target virtual resource and obtaining the transaction execution result of the resource consumption task, is configured to:

determine an address relationship between the initiating object address and the holding object address.

19. The computer device according to claim 17, wherein the processor, when being configured to execute the plurality of instructions to determine the holding object address, is configured to:

acquire a first index key-value pair, the first index key-value pair comprising a first index key according to a virtual resource and a first index value according to a resource identifier;

acquire, according to the first index key-value pair and the target resource identifier, the target virtual resource; and acquire a holding object address of the target virtual resource.

20. The computer device according to claim 17, wherein the processor is further configured to execute the plurality of instructions to:

return, if the transaction execution result is a resource consumption success result, the resource consumption success result to a resource device, wherein the resource device updates, according to the resource consumption success result, a current resource state of the target virtual resource to a resource consumed state, and acquire item consumption information of the target item, the item consumption information being stored in association with a resource consumption state of the target virtual resource.

* * * * *